US009400228B2

(12) United States Patent
Niimi et al.

(10) Patent No.: US 9,400,228 B2
(45) Date of Patent: Jul. 26, 2016

(54) DEVICE FOR BENDING OPTICAL FIBER AND RECEIVING LIGHT FOR TESTING

(75) Inventors: Shinichi Niimi, Yamaga (JP); Noriyuki Kawanishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 13/109,617

(22) Filed: May 17, 2011

(65) Prior Publication Data

US 2011/0217004 A1    Sep. 8, 2011

Related U.S. Application Data

(63) Continuation of application No. PCT/JP2009/060622, filed on Jun. 10, 2009.

(30) Foreign Application Priority Data

Nov. 17, 2008    (JP) .................................. 2008-293641

(51) Int. Cl.
   *G02B 6/26*     (2006.01)
   *G02B 6/42*     (2006.01)
   *G01M 11/08*    (2006.01)
   *G02B 6/28*     (2006.01)

(52) U.S. Cl.
   CPC ........... *G01M 11/088* (2013.01); *G02B 6/2852* (2013.01); *G02B 6/4201* (2013.01)

(58) Field of Classification Search
   None
   See application file for complete search history.

(56) References Cited

U.S. PATENT DOCUMENTS

| | | | | |
|---|---|---|---|---|
| 3,982,123 A | * | 9/1976 | Goell et al. ............... | 250/227.24 |
| 4,232,934 A | * | 11/1980 | Feinbloom ...................... | 385/88 |
| 4,729,630 A | * | 3/1988 | Martinez ................ | G02B 6/266 |
| | | | | 250/227.14 |
| 4,765,704 A | * | 8/1988 | Pers ...................... | G02B 6/2551 |
| | | | | 385/139 |
| 4,961,620 A | * | 10/1990 | Uken et al. ...................... | 398/45 |
| 5,009,479 A | | 4/1991 | Morrison | |
| 5,067,786 A | * | 11/1991 | Hawkins et al. ................. | 385/13 |
| 5,138,690 A | * | 8/1992 | Cox ............................... | 385/137 |
| 5,235,657 A | * | 8/1993 | Tardy .............................. | 385/48 |
| 5,343,541 A | * | 8/1994 | Uken et al. ...................... | 385/16 |
| 5,519,795 A | * | 5/1996 | Bender et al. ................... | 385/13 |
| 5,708,499 A | * | 1/1998 | Baden et al. ................. | 356/73.1 |
| 5,742,715 A | * | 4/1998 | Boehlke et al. ................. | 385/32 |

(Continued)

FOREIGN PATENT DOCUMENTS

| | | |
|---|---|---|
| CN | 201116897 Y | 9/2008 |
| EP | 0212877 A2 | 3/1987 |

(Continued)

OTHER PUBLICATIONS

Chinese Office Action issued Oct. 11, 2012 in Application No. 200980141607.9.

(Continued)

*Primary Examiner* — Andrew Jordan
(74) *Attorney, Agent, or Firm* — Sughrue Mion, PLLC

(57) ABSTRACT

A device for bending an optical fiber and receiving light is provided with a recessed holding member having a recess, a projecting holding member having a projection projecting toward the recess, light receiving elements for receiving leak light from an optical fiber held between the recess and the projection, and a supplemental support mechanism that is substantially independent of the recess or the projection and supplementarily supports the optical fiber between the recess and the projection such that the leak light from the optical fiber is received by center of the light receiving elements.

2 Claims, 14 Drawing Sheets

(56) References Cited

U.S. PATENT DOCUMENTS

| | | | |
|---|---|---|---|
| 7,283,688 B2* | 10/2007 | Frigo | G01M 11/088 385/1 |
| 8,023,774 B2* | 9/2011 | Frigo | G01M 11/088 356/73.1 |
| 8,731,341 B2* | 5/2014 | Sanderson et al. | 385/12 |
| 2004/0051874 A1* | 3/2004 | Kubitzek | G01J 3/50 356/402 |
| 2005/0041902 A1* | 2/2005 | Frigo | G01M 11/088 385/1 |
| 2006/0110088 A1* | 5/2006 | Frigo | G01M 11/088 385/1 |
| 2008/0024769 A1* | 1/2008 | Frigo | G01M 11/088 356/73.1 |
| 2008/0192241 A1* | 8/2008 | He | G02B 6/2852 356/73.1 |
| 2009/0103865 A1* | 4/2009 | Del Rosso | G02B 6/4202 385/32 |
| 2011/0217004 A1* | 9/2011 | Niimi et al. | 385/32 |

FOREIGN PATENT DOCUMENTS

| | | |
|---|---|---|
| EP | 0436354 A1 | 7/1991 |
| EP | 0485848 A2 | 5/1992 |
| JP | 62-115106 A | 5/1987 |
| JP | 1-237509 A | 9/1989 |
| JP | 03-069102 U | 7/1991 |
| JP | 2006-235362 A | 9/2006 |
| JP | 2007-085934 A | 4/2007 |
| JP | 2010-032238 A | 2/2010 |
| JP | 2011059033 A * | 3/2011 |
| JP | 2011059034 A * | 3/2011 |
| JP | 2011089870 A * | 5/2011 |

OTHER PUBLICATIONS

Communication dated Oct. 12, 2015, from the European Patent Office in counterpart European Application No. 09825962.5.

* cited by examiner

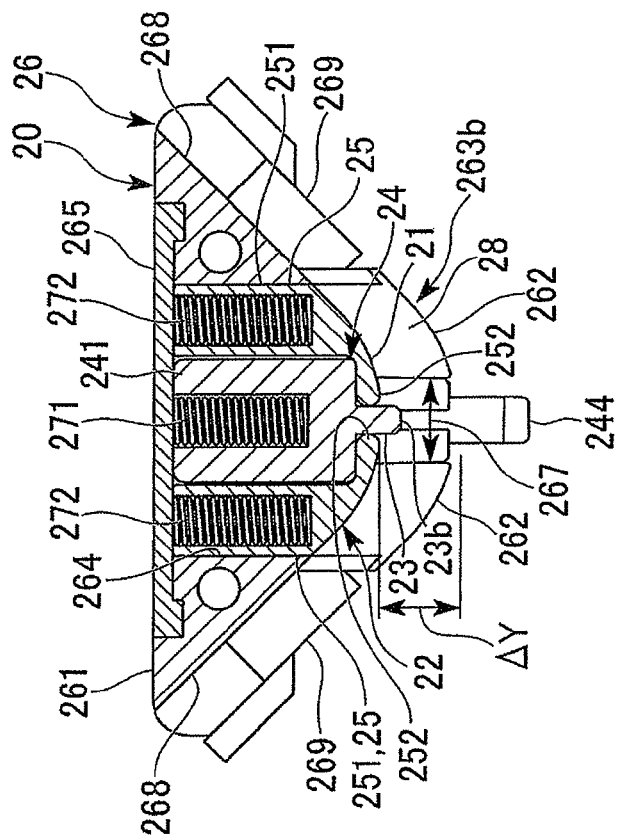
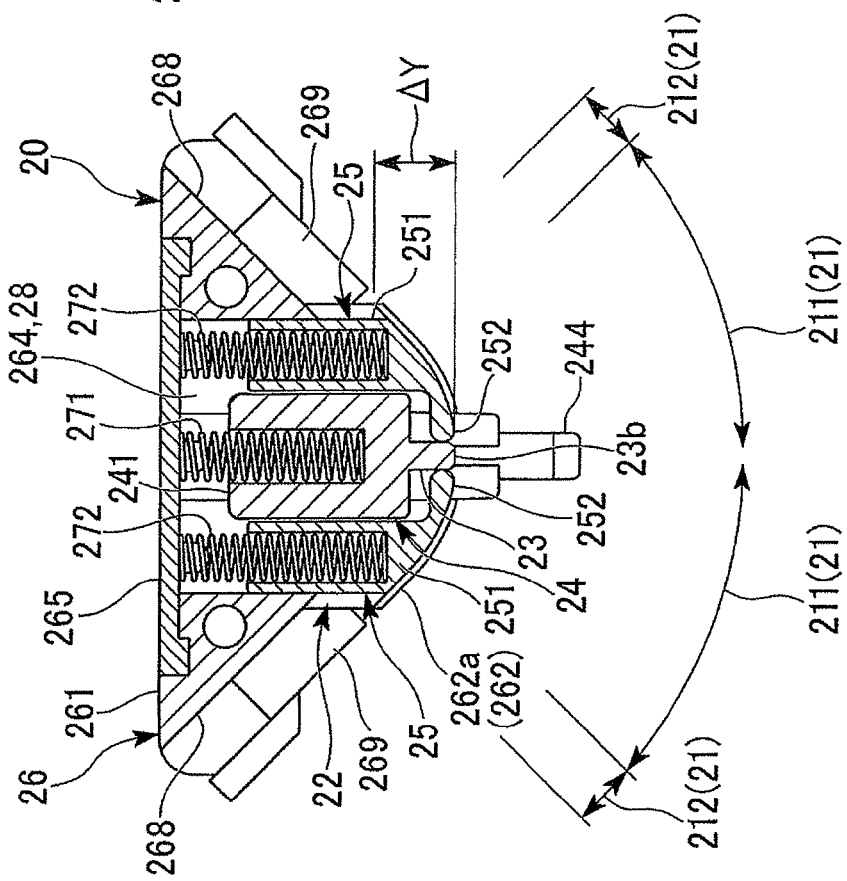
FIG. 4A
FIG. 4B

FIG. 13A   FIG. 13B
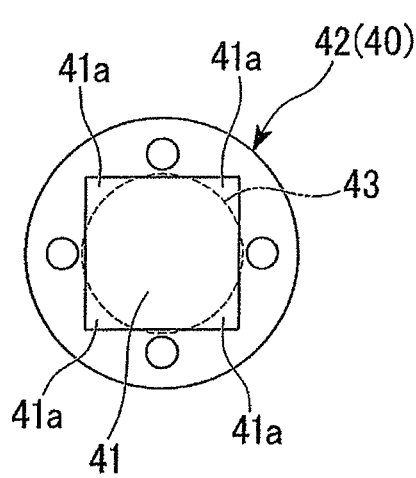
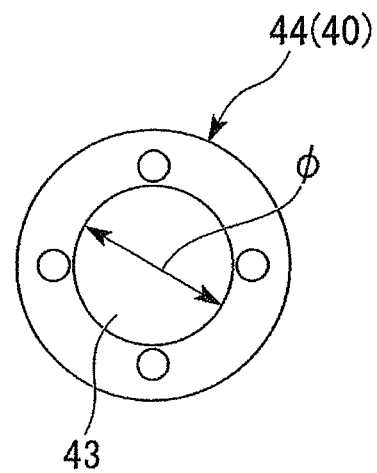
FIG. 14
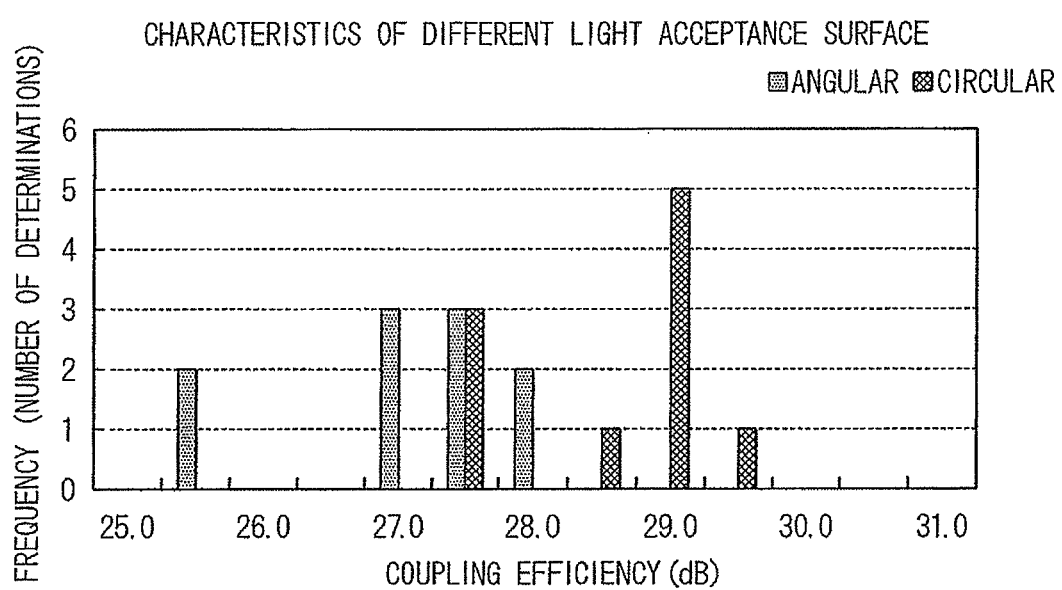

DEVICE FOR BENDING OPTICAL FIBER AND RECEIVING LIGHT FOR TESTING

CROSS REFERENCE TO RELATED APPLICATIONS

This application is a continuation application based on a PCT Patent Application No. PCT/JP2009/060622, filed Jun. 10, 2009, whose priority is claimed on Japanese Patent Application No. 2008-293641 filed Nov. 17, 2008, the entire content of which are hereby incorporated by reference.

BACKGROUND OF THE INVENTION

1. Field of the Invention

The present invention relates to a device for bending an optical fiber and receiving light used as an optical fiber identifier, a hot-line determination device, or the like. The device for bending an optical fiber and receiving light is used in optical fiber work such as laying, maintenance, and removal of optical fibers. The present invention particularly relates to a device for bending an optical fiber and receiving light that nondestructively performs for example a fiber core identification or a hot-line determination of an optical fiber such as an optical fiber core, an optical fiber strand, or an optical fiber code.

2. Description of the Related Art

This type of device for bending an optical fiber and receiving light is provided with a mechanism that holds an optical fiber, such as an optical fiber core, an optical fiber strand, or an optical fiber code, and bends it (fiber holding and bending mechanism), and an optical detector (light receiving element). In work such as laying, maintaining, and removing an optical fiber communication network, the device for bending an optical fiber and receiving light holds the optical fiber and deforms it by bending, and the optical detector detects the slight amount of communication light or a specific signal light that leaks from the bending portion to the outside. Thus, a hot-line determination of whether there is communication light, and a core identification for determining whether the optical fiber is a specific one, are performed nondestructively (see for example Patent Document 1: Japanese Unexamined Patent Application, First Publication No. 2006-235362).

FIG. 18 is a plan view showing a schematic configuration of a related device for bending an optical fiber and receiving light. FIG. 19A is a perspective view showing a projecting holding member of the device for bending an optical fiber and receiving light. FIG. 19B is a side view showing the structure in FIG. 19A viewed from the direction of arrow A.

As shown in FIG. 18, a device for bending an optical fiber and receiving light 101 includes a plate-like recessed holding member 110 having a recessed surface 111, and a projecting holding member 120 having a plate-like projection 122 forming a projecting surface 121 opposite the recessed surface 111. Generally, an optical fiber 140 is held between the recessed surface 111 of the recessed holding member 110 and the projecting surface 121 of the projecting holding member 120.

As shown in FIGS. 18 and 19A, the projecting surface 121 of the projection 122 of the projecting holding member 120 is formed on an outer peripheral side face of the projection 122, and formed as a shape along the recessed surface 111 of the recessed holding member 110.

The projecting holding member 120 can move parallel to a direction going toward and away from the recessed holding member 110. The projecting holding member 120 can move from an unclamped position, indicated by an imaginary line in FIG. 18, to a clamped position, indicated by a solid line in FIG. 18. As indicated by the solid line in FIG. 18, the clamped position is the position where the optical fiber 140 is held between the recessed holding member 110 and the projecting holding member 120 which has moved near to the recessed holding member 110. When the projecting holding member 120 is installed at the clamped position, the optical fiber 140 can be clamped (held) between the recessed surface 111 of the recessed holding member 110 and the projecting surface 121 of the projecting holding member 120; in addition, the optical fiber 140 can be bent. The recessed holding member 110 and the projecting holding member 120 constitute a fiber holding and bending mechanism that holds the optical fiber and applies a bend to it.

A light receiving element (optical detector) 130 of the device for bending an optical fiber and receiving light 101 in this example is assembled in the recessed holding member 110. To receive leak light from the optical fiber 140 which is held and bent by an optical fiber holding part 102, the light receiving element 130 is disposed such that a light acceptance surface 131 thereof is exposed at the recessed surface 111.

In the related art, the device for bending an optical fiber and receiving light 101 having the following structure is proposed. To accommodate optical fibers of various covered outer diameters, a fiber storage groove 103 having a groove width t is provided between the recessed surface 111 of the recessed holding member 110 and the projecting surface 121 of the projection 122 of the projecting holding member 120 installed at the clamped position. The groove width t of the optical fiber storage groove 103 is equal to or slightly larger than the covered outer diameter of the optical fiber having the covered outer diameter that is the largest (hereinafter 'largest covered outer diameter') among those being subjected to hot line determination and core identification (hereinafter 'optical fiber with largest outer diameter', denoted by reference numeral 141). Moreover, in the case of an optical fiber 142 which has a covered outer diameter that is smaller than the largest covered outer diameter (see FIG. 20; hereinafter 'optical fiber with narrow diameter'), the projecting holding member 120 is moved from the unclamped position to the clamped position, and meanders into the optical fiber storage groove 103 having groove width t such that the optical fiber 142 is held in a bent state, whereby leak light can be generated (see for example paragraphs (0018), (0019), (0033), FIG. 1, and FIG. 2 of Patent Document 1).

As shown in FIG. 19B, the recessed surface 111 of the recessed holding member 110 and the projecting surface 121 of the projecting holding member 120 of the device for bending an optical fiber and receiving light 101 described above are formed perpendicular to the interval direction between the projecting surface 121 and the recessed surface 111 of the recessed holding member 110 (the left-right direction within the sheet in FIG. 19B).

As shown in FIGS. 19A and 19B, on the projection 122 of the projecting holding member 120, two rib-like protrusions 123a and 123b are provided on both sides of the projecting surface 121, and extend parallel to each other along the projecting surface 121. The projecting surface 121 is formed between this pair of protrusions 123a and 123b.

When the projecting holding member 120 of the device for bending an optical fiber and receiving light 101 moves from the unclamped position (indicated by the imaginary line in FIG. 18) to the clamped position (indicated by the solid line in FIG. 18), the optical fiber storage groove 103 is formed between the recessed surface 111 and the projecting surface 121. Also, the tips of the pair of protrusions 123a and 123b protruding from the projection 122 abut to the recessed holding member 110, locking the projecting holding member 120 in the recessed holding member 110. As shown in FIG. 19A, light shielding members 124 stop disturbance light from being incident to the light receiving element 130. The light shielding members 124 are elastic bodies made from foam resin, and are attached at both ends of the extending direction of the projecting surface 121 of the projecting holding member 120. Thus the optical fiber storage groove 103 reliably forms a dark box.

As shown in FIG. 19B, in the device for bending an optical fiber and receiving light 101 described above, the distance s between the pair of protrusions 123a and 123b of the projecting holding member 120 is slightly larger than the covered outer diameter of the optical fiber with largest outer diameter 141. As already explained, the groove width t of the optical fiber storage groove 103 is equal to or slightly larger than the covered outer diameter of the optical fiber with largest outer diameter 141. Therefore, when the optical fiber with narrow diameter 142 is held between the recessed surface 111 of the recessed holding member 110 and the projecting surface 121 of the projecting holding member 120, as shown in FIG. 20, the position of the optical fiber with narrow diameter 142 in the width direction of the projecting surface 121 (in FIG. 20, the top-bottom direction within the sheet) is not fixed. As a result, the optical fiber 142 deviates greatly from the light acceptance surface 131 of the light receiving element 130, leading to problems such as only some of the leak light being coupled, or variation in the measurement of the leak light.

SUMMARY

The present invention has been realized in view of the above circumstances, and aims to provide a device for bending an optical fiber and receiving light that can align the position of an optical fiber disposed between a recessed surface of a recessed holding member and a projecting surface of a projecting holding member to the center of light acceptance surfaces of light receiving elements, and can stably measure leak light from the optical fiber which is held between the recessed holding member and the projecting holding member and deformed by bending.

To achieve the above objects, the invention employs the followings:

(1) The device for bending an optical fiber and receiving light of the invention includes: a recessed holding member having a recess, a projecting holding member having a projection that projects toward the recess, light receiving elements for receiving leak light from an optical fiber held between the recess and the projection, and a supplemental support mechanism that is substantially independent of the recess or the projection and supplementarily supports the optical fiber between the recess and the projection such that the leak light from the optical fiber is received by center of the light receiving elements.

(2) In (1), the supplemental support mechanism can include a protrusion that can move relative to the projection and can protrude from the summit of the projection of the projecting holding member.

(3) In (2), the supplemental support mechanism can further include a movable member that includes the protrusion and can move relative to the projection, and a second urging member that urges the movable member toward the recess such that the protrusion touches the optical fiber.

(4) In (1), the projecting holding member further can include a first urging member that urges at least one part of the projection toward the recess such that the projection touches the optical fiber.

(5) In (1), the device for bending an optical fiber and receiving light can further include: a first contacting part and a second contacting part where the projection and the optical fiber touch each other, and a third contacting part where one part of the supplemental support mechanism and the optical fiber touch each other, with the first contacting part and the second contacting part being mutually separated, and the third contacting part being disposed between the first contacting part and the second contacting part.

(6) In (1), the protrusion can include a recess that extends in a first direction and which at least one part of the optical fiber is disposed in, this recess being curved when viewed in a cross-section intersecting the first direction.

(7) In (1), the projection can include a groove that extends in a first direction and at least one part of the optical fiber is disposed in, the groove being curved when viewed in a cross-section intersecting the first direction.

(8) In (1), the light receiving elements can have light acceptance surfaces that are substantially circular or substantially rectangular.

According to the device for bending an optical fiber and receiving light of the present invention, an optical fiber disposed between the recessed surface of a recessed holding member and the projecting surface of a projecting holding member can be aligned to the center of the light acceptance surfaces of light receiving elements by an alignment mechanism provided at an optical fiber holding part. This makes it possible to stably measure leak light generated from the optical fiber when it is held and bent between the recessed holding member and the projecting holding member.

BRIEF DESCRIPTION OF THE DRAWINGS

FIG. 4A is a plan cross-sectional view of the internal structure of a projecting holding member of the same device for bending an optical fiber and receiving light, and illustrates a state where three of the moving members constituting the projection are not depressed (initial positions).

FIG. 4B is a plan cross-sectional view of the internal structure of a projecting holding member of the same device for bending an optical fiber and receiving light, and illustrates a state where all moving members constituting the projection are depressed.

FIG. 13A is an explanatory view of a light receiving element that can be applied in the device for bending an optical fiber and receiving light according to the invention, and illustrates a light receiving element having a light acceptance surface that is rectangular when viewed from the light acceptance surface side.

FIG. 13B is an explanatory view of a light receiving element that can be applied in the device for bending an optical fiber and receiving light according to the invention, and illustrates a light receiving element having a light acceptance surface that is circular when viewed from the light acceptance surface side.

FIG. 14 is a graph showing results obtained by investigating, in the light receiving element of FIG. 13A and the light receiving element of FIG. 13B, the coupling efficiency in the light receiving element of leak light from an optical fiber held by the device for bending an optical fiber and receiving light of FIG. 1.

DETAILED DESCRIPTION OF THE PREFERRED EMBODIMENTS

A device for bending an optical fiber and receiving light according to an embodiment of the invention will be explained with reference to the drawings.

Figure 1:
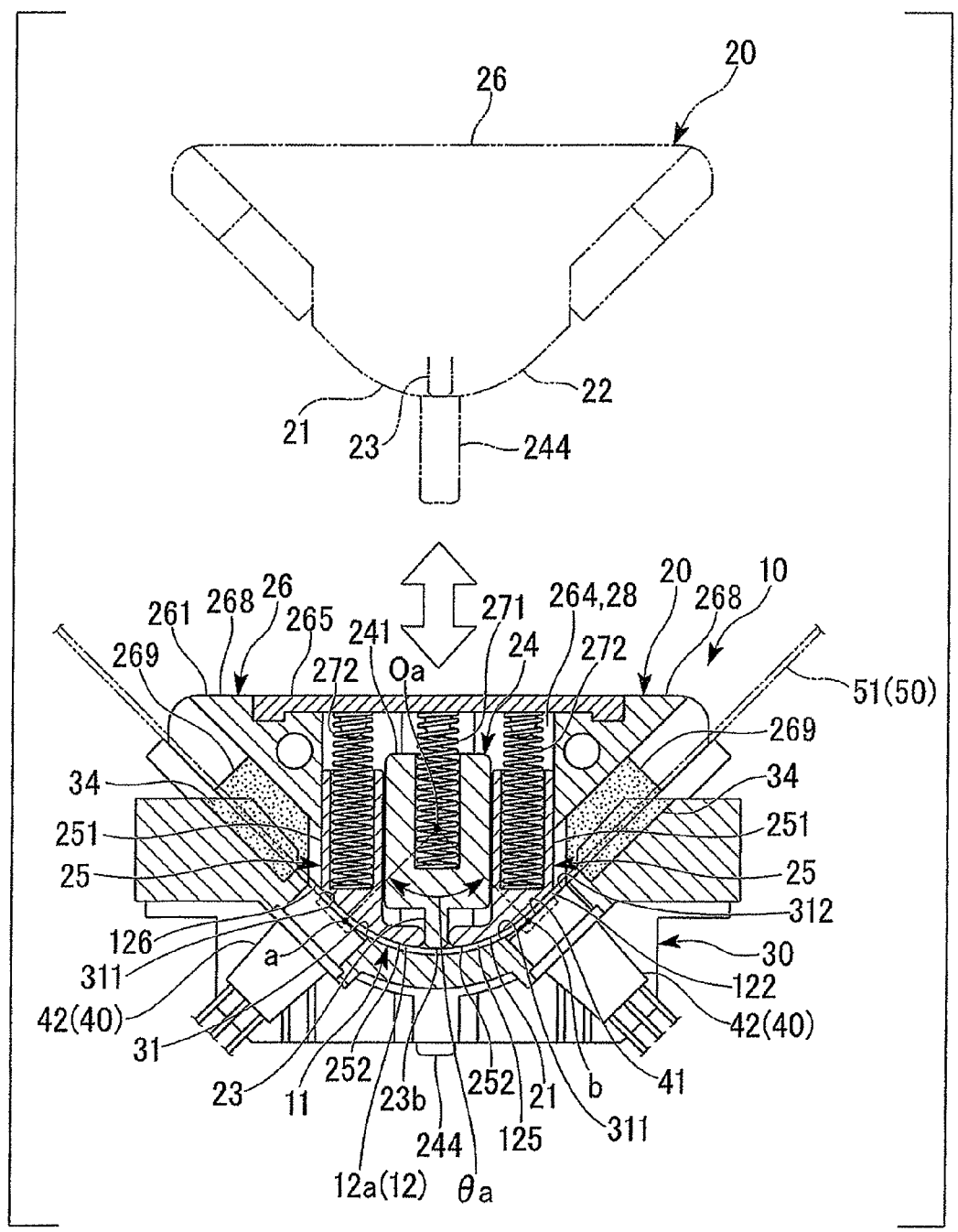
FIG. 1 is a plan cross-sectional view of the structure of a device for bending an optical fiber and receiving light according to an embodiment of the invention.
Figure 2A:
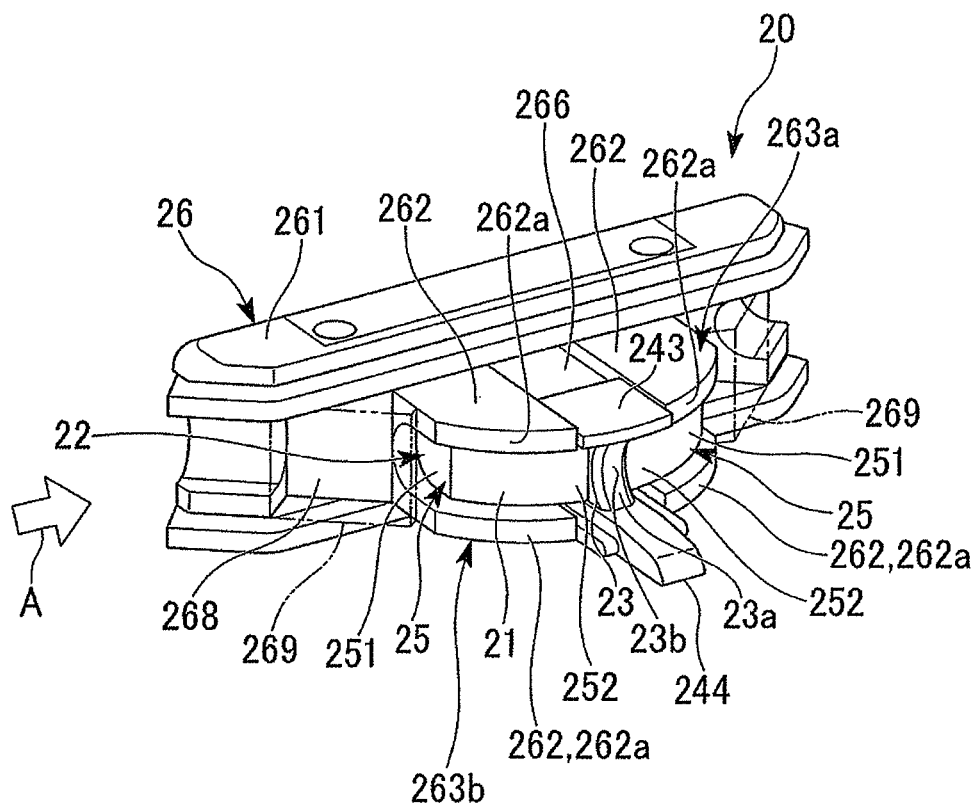
FIG. 2A is a perspective view of the external structure of a projecting holding member of the same device for bending an optical fiber and receiving light.
Figure 2B:
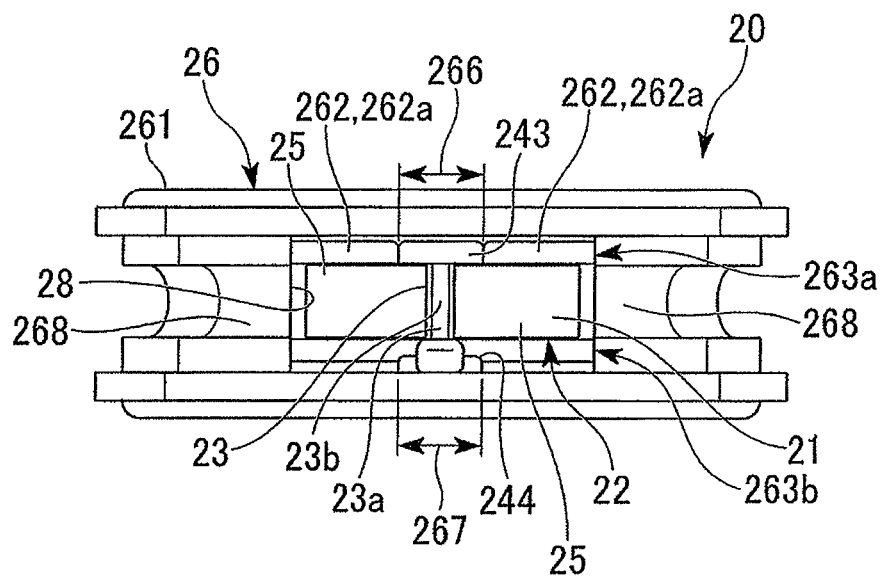
FIG. 2B is a front view of the external structure of a projecting holding member of the same device for bending an optical fiber and receiving light.
Figure 3A:
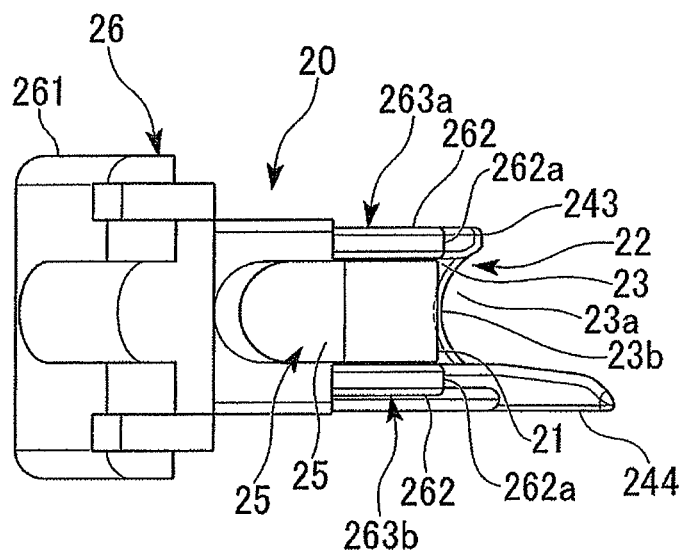
FIG. 3A is a side view of the external structure of a projecting holding member of the same device for bending an optical fiber and receiving light.
Figure 3B:
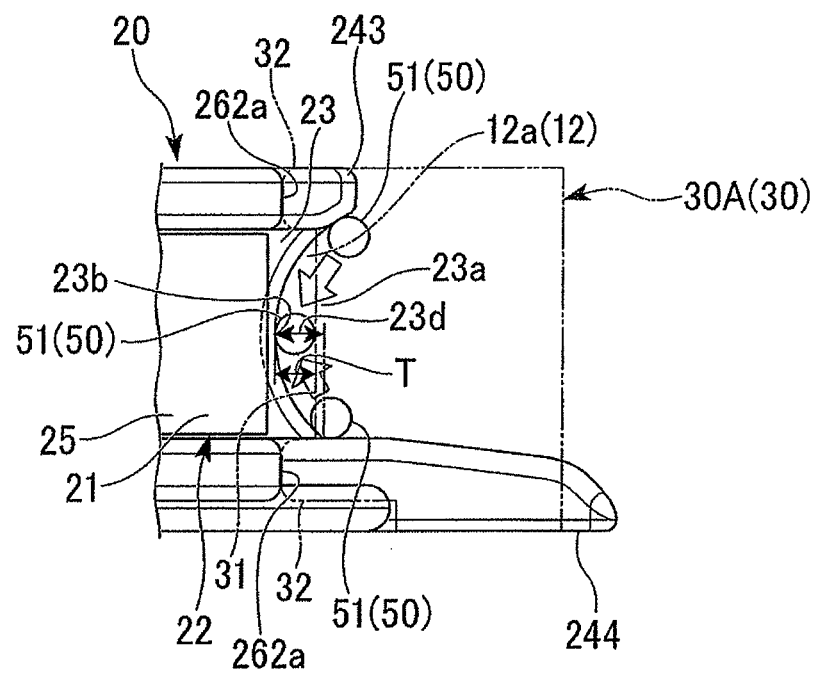
FIG. 3B is an enlarged side view of the tip vicinity of a projection of a projecting holding member of the same device for bending an optical fiber and receiving light.
Figure 5:
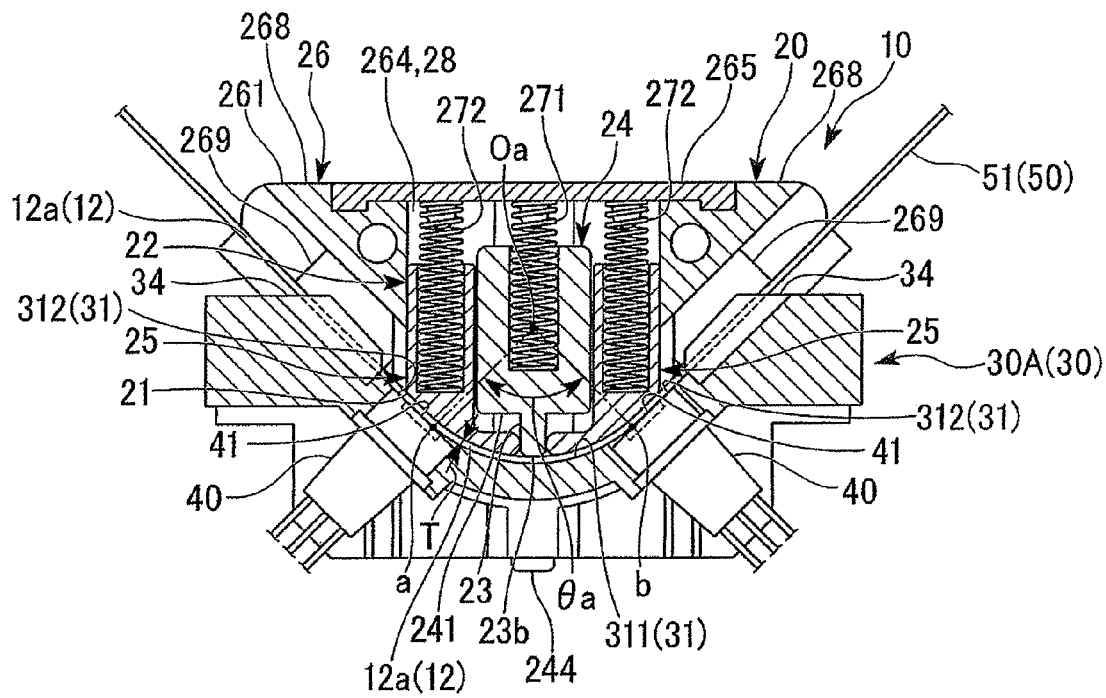
FIG. 5 is a plan cross-sectional view of a state where the same device for bending an optical fiber and receiving light holds an optical fiber with smallest outer diameter.
Figure 6:
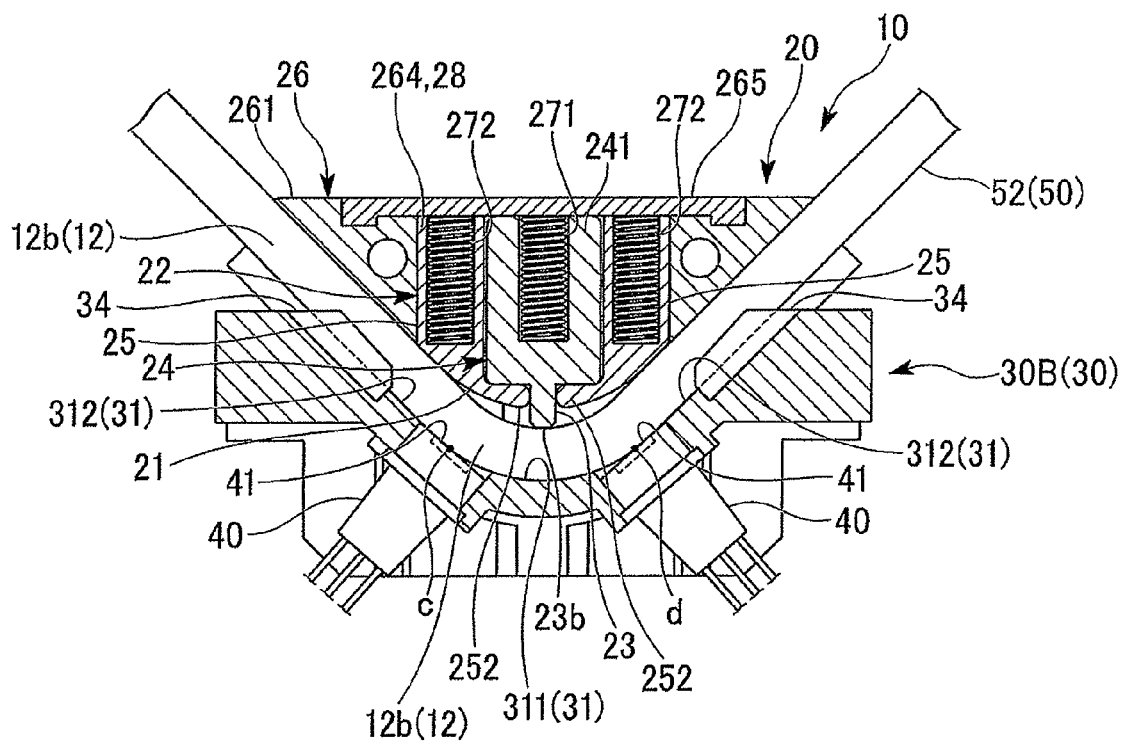
FIG. 6 is a plan cross-sectional view for explanation of a state where the same device for bending an optical fiber and receiving light holds an optical fiber with thick diameter.

FIG. 1 is a plan cross-sectional view of the structure of a device for bending an optical fiber and receiving light 10 according to this embodiment. FIG. 2A is a diagonal view of the external structure of a projecting holding member 20 of the device for bending an optical fiber and receiving light 10. FIG. 2B is a front view of the external structure of the projecting holding member 20 of the device for bending an optical fiber and receiving light 10. FIG. 3A is a side view of the external structure of the projecting holding member 20. FIG. 3B is an enlarged side view of the tip vicinity of the projection of the projecting holding member 20. FIG. 4A is a plan cross-sectional view of the internal structure of a projecting holding member 20, and illustrates a state where each of three moving members constituting the projection 22 is not depressed (i.e. is at its initial position). FIG. 4B is a plan cross-sectional view of the internal structure of a projecting holding member 20, and illustrates a state where all moving members 24, 25, and 25 constituting the projection 22 are depressed. FIG. 5 is an explanatory plan cross-sectional view of a state where the device for bending an optical fiber and receiving light 10 holds an optical fiber with smallest outer diameter 51 (explained later). FIG. 6 is a plan cross-sectional view for explanation of a state where the device for bending an optical fiber and receiving light 10 holds an optical fiber 52 that is broader (has a greater covered outer diameter) than the optical fiber with smallest outer diameter 51.

Figure 7:
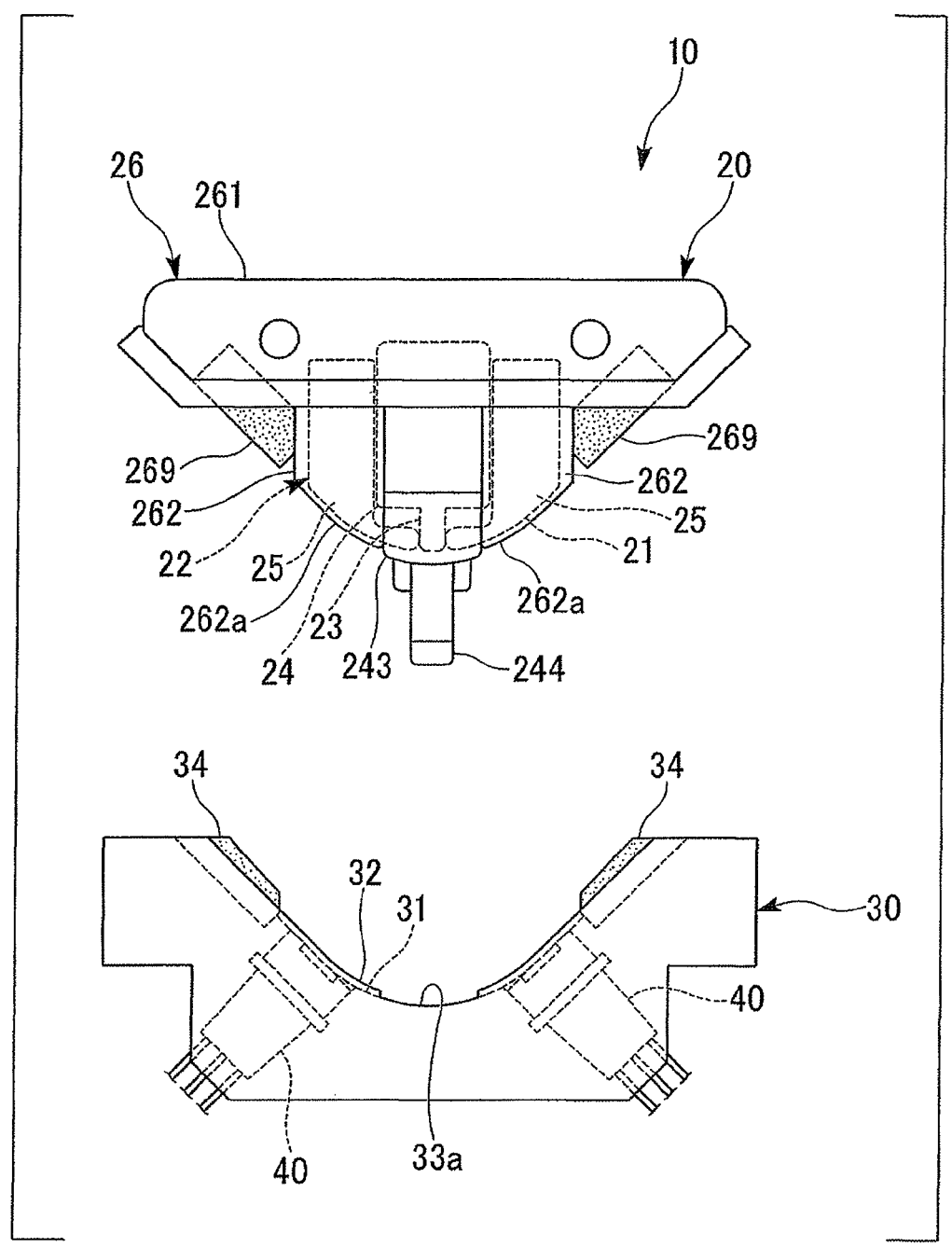
FIG. 7 is a plan view of the configuration of the same device for bending an optical fiber and receiving light, and illustrates a state where the projecting holding member is installed at an unclamped position.
Figure 8A:
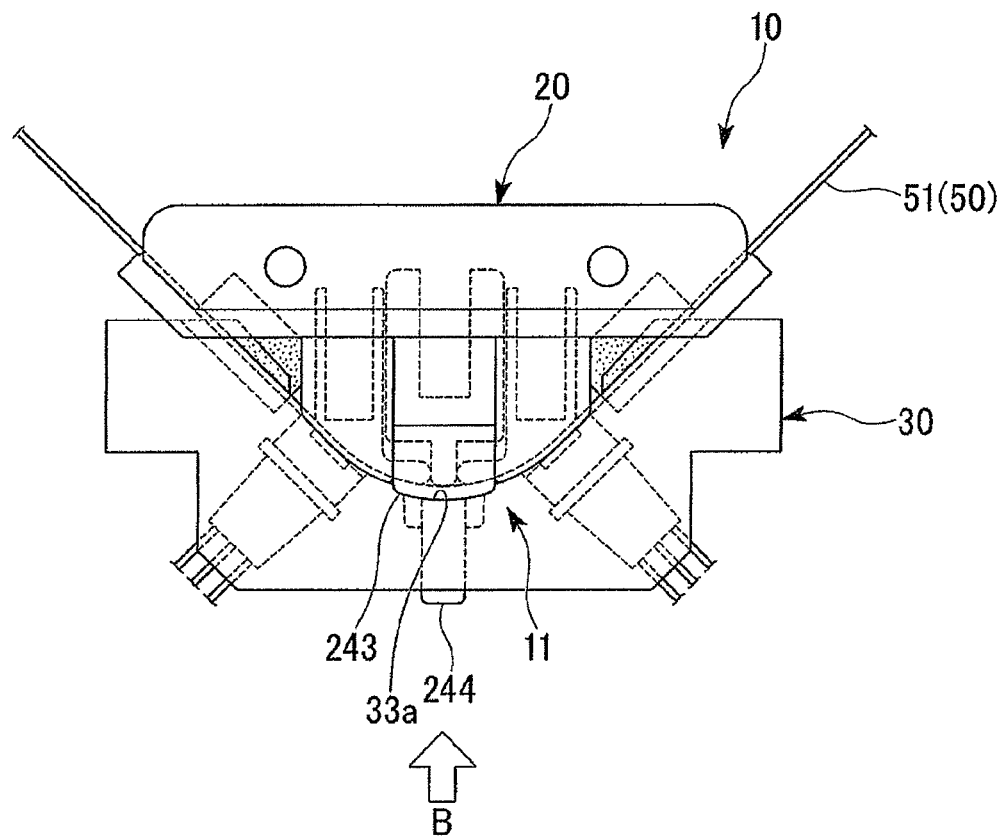
FIG. 8A is a plan cross-sectional view of the configuration of the same device for bending an optical fiber and receiving light, and illustrates a state where the projecting holding member is installed at a clamped position.
Figure 8B:
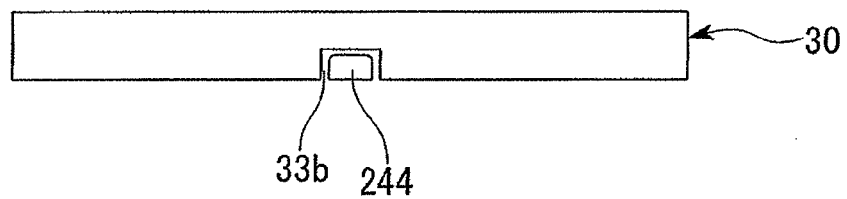
FIG. 8B is a view of a state where a recessed holding member is viewed from the direction of arrow B in FIG. 8A.

FIG. 7 is an explanatory plan view of the configuration of the device for bending an optical fiber and receiving light 10, and illustrates a state where the projecting holding member 20 is installed at an unclamped position. FIG. 8A is an explanatory plan cross-sectional view of the configuration of the device for bending an optical fiber and receiving light 10, and illustrates a state where the projecting holding member 20 is installed at a clamped position. FIG. 8B is a view of a state where a recessed holding member 30 is viewed from the direction of arrow B in FIG. 8A.

The device for bending an optical fiber and receiving light 10 bends the optical fiber 50 and measures leak light. As shown in FIG. 1, the device for bending an optical fiber and receiving light 10 includes a plate-like recessed holding member 30 having a recessed surface 31, a projecting holding member 20 having a projection 22 forming a projecting surface 21 opposite the recessed surface 31, and light receiving elements 40 that receive leak light leaking from the optical fiber 50 that is held and bent between the recessed surface 31 of the recessed holding member 30 and the projecting surface 21 formed by the projection 22 of the projecting holding member 20.

A positioning protrusion 23 for aligning the optical fiber 50 to the center of light acceptance surfaces 41 of the light receiving elements 40 is provided at the tip of the projection 22 of the projecting holding member 20. A specific configuration of this positioning protrusion 23 will be explained later.

The projecting holding member 20 of the device for bending an optical fiber and receiving light 10 can move parallel to a direction going toward and away from the recessed holding member 30, and can switch between a position that can hold the optical fiber 50 being examined and bend it to generate leak light (a clamped position, indicated by the solid line in FIG. 1; see also FIGS. 5, 6, etc.) and an unclamped position indicated by the imaginary line in FIG. 1. When the projecting holding member 20 is in the unclamped position, a gap between the projecting holding member 20 and the recessed holding member 30 is large enough to allow the optical fiber 50 to be easily stored, or removed from, this gap.

As shown in FIG. 1, when the projecting holding member 20 is moved from the unclamped position to the clamped position (brought near to the recessed holding member 30), an optical fiber holding part 11 for holding the optical fiber 50 is formed between the recessed surface 31 of the recessed holding member 30 and the projection 22 of the projection 22. The optical fiber 50 can be bent when it is held in the optical fiber holding part 11. At this time, the recessed surface 31 of the recessed holding member 30 and the projection 22 of the projecting holding member 20 define the optical fiber storage groove 12 for accommodating the optical fiber 50, which is thus accommodated in the optical fiber storage groove 12.

As shown in FIGS. 2A, 2B, 4A, and 4B, the projection 22 of the projecting holding member 20 of the device for bending an optical fiber and receiving light 10 described here includes a movable member fitted with protrusion 24 (depressible part) which is a movable member with the positioning protrusion 23 protruding therefrom, and side movable members 25 and 25 (depressible parts) which are movable members provided on both sides of the movable member fitted with protrusion 24. Hereinafter, the movable member fitted with protrusion 24 and the pair of side movable members 25 and 25 will sometimes be termed 'movable members 24, 25, and 25'.

The projecting holding member 20 includes the three movable members 24, 25, and 25 constituting the projection 22, and urging members 271, 272, and 272 for elastically urging the movable members 24, 25, and 25 toward the recessed holding member 30 respectively; all these are assembled in a projecting holding member body 26.

As shown in FIG. 4B, the three movable members 24, 25, and 25 constituting the projection 22 are depressible parts that can be pressed (depressed) such as to maximize the distance from the recessed holding member 30. To press the movable members 24, 25, and 25, a pressing force is applied to elastically deform the urging members. When depressed, the three movable members 24, 25, and 25 are respectively elastically urged toward the recessed holding member 30 by the urging members 271, 272, and 272 assembled in the projecting holding member body 26. As shown in FIGS. 5 and 6, this configuration enables the device for bending an optical fiber and receiving light 10 to hold an optical fiber which is to be subjected to a hot-line determination and a core identification (hereinafter 'optical fiber for examination') with various covered outer diameters.

In FIG. 5 an optical fiber being held between the projecting holding member 20 and the recessed holding member 30 is the one whose covered outer diameter is the smallest among the optical fibers for examination. Hereinafter, 'covered outer diameter is the smallest' is shortened to 'smallest covered outer diameter', 'optical fiber whose covered outer diameter is the smallest' is shortened to 'optical fiber with smallest outer diameter, and this fiber is termed optical fiber with smallest outer diameter 51.

In the device for bending an optical fiber and receiving light 10, when the projecting holding member 20 is installed at the clamped position, an optical fiber storage groove 12a having a groove width T which is equal to the covered outer diameter of the optical fiber with smallest outer diameter 51 is formed between the recessed surface 31 of the recessed holding member 30 and the projection 22 of the projecting holding member 20, enabling the optical fiber with smallest outer diameter 51 to be held therein. The groove width T of the optical fiber storage groove 12a is constant along the whole longitudinal direction of the optical fiber storage groove 12a.

When the device for bending an optical fiber and receiving light 10 holds the optical fiber with smallest outer diameter 51, the three movable members 24, 25, and 25 constituting the projection 22 do not push against (depress) the projecting holding member 20. In the present specification, this non-pushing state of the movable members is termed the 'non-depressed state'. The positions of the movable members 24, 25, and 25 on the projecting holding member 20 when they are in the non-depressed state are termed 'initial positions'. FIG. 4A shows a state where three movable members 24, 25, and 25 of the projection 22 are positioned in an initial position. In FIG. 5, the optical fiber storage groove 12a is one state of the optical fiber storage groove 12, defined by the recessed surface 31 of the recessed holding member 30 and the projection 22 of the projecting holding member 20 when holding the optical fiber with smallest outer diameter 51.

FIG. 6 illustrates a state where an optical fiber with a larger covered outer diameter than the optical fiber with smallest outer diameter 51 is held between the projecting holding member 20 and the recessed holding member 30. Hereinafter, 'optical fiber with a larger covered outer diameter' is termed 'optical fiber with thick diameter', and is denoted as optical fiber with thick diameter 52.

At this time, the movable members 24, 25, and 25 constituting the projection 22 are pushed by the projecting holding member 20 and depressed from their initial positions. Due to the elasticity (urging force) of the urging members 271, 272, and 272, the depressed movable members 24, 25, and 25 push the optical fiber 50 (optical fiber with thick diameter 52) against the recessed surface 31 of the recessed holding member 30. This enables the optical fiber with thick diameter 52 to be held. If the projecting holding member 20 is moved from the state of holding the optical fiber with thick diameter 52 to the unclamped position, the elasticity of the urging member 271 returns the movable members 24, 25, and 25 constituting the projecting holding member 20 to their initial positions.

In FIG. 6, optical fiber storage groove 12b is one state of the optical fiber storage groove 12, defined by the recessed surface 31 of the recessed holding member 30 and the projection 22 of the projecting holding member 20 when holding the optical fiber with thick diameter 52.

Subsequently, the projecting holding member 20 will be explained more specifically.

As shown in FIGS. 2A and 2B, the projecting holding member body 26 specifically includes an elongated base 261, and a pair of movable member-guiding pieces 263a and 263b constituted by plate-like movable member-guiding pieces 262 that protrude to the center of the base 261 in a longitudinal direction thereof.

As shown in FIGS. 4A and 4B, a depressible member storage recess 264 is provided in the center of the base 261 in the longitudinal direction thereof, and that is a depressed portion which is depressed from the side surfaces (outer peripheral surfaces) thereof. Specifically, the depressible member storage recess 264 is formed by sealing one of the rectangular-hole end openings that pass through the base 261 with a back-face plate 265 attached to the base 261, and constitutes a recessed portion with a frontally-viewed shape (the shape when viewed in the direction of the arrow A in FIG. 2A; the shape shown in FIG. 2B) that is substantially a rectangle extending the longitudinal direction of the base 261.

In regard to the projecting holding member 20, the direction extending in the longitudinal direction of the base 261 will hereinafter be abbreviated as 'longitudinal direction'.

As shown in FIGS. 2A and 2B, two of the movable member-guiding pieces 262 protrude from both sides of the width direction of the depressible storage recess 264 in which the width direction is orthogonal to the frontally-viewed longitudinal direction of the opening in the base 261 (the top-bottom direction in FIGS. 2A and 2B).

Two movable member-guiding pieces 262 are provided with a slit-like gap 266 between them on a first side of the width direction of the depressible storage recess 264 in which the two movable member-guiding pieces 262 are separated from each other in the longitudinal direction of the depressible storage recess 264. The pair of movable member-guiding pieces 262 with the gap 266 between them constitute one of the pair of movable member-guiding plates 263a and 263b (the movable member denoted by reference numeral 263a). The two movable member-guiding pieces 262 on the second side of the width direction of the depressible storage recess 264 are provided at two points corresponding to the two movable member-guiding pieces 262 on the first side of the width direction of the depressible storage recess 264, such that they are parallel to the movable member-guiding pieces 262 on the first side of the width direction of the depressible storage recess 264. The two movable member-guiding pieces 262 on the second side of the width direction of the depressible storage recess 264 are provided with a slit-like gap 267 between them and separated from each other in the longitudinal direction of the depressible storage recess 264, and constitute the other one of the pair of movable member-guiding plates 263a and 263b (the movable member denoted by reference numeral 263b).

That is, each of the pair of movable member-guiding plates 263a and 263b includes two movable member-guiding pieces 262 which are protruded separately in the longitudinal direction of the depressible storage recess 264, and a gap between each pair of movable member-guiding pieces 262 is obtained.

The three movable members 24, 25, and 25 (the movable member fitted with protrusion 24 and the pair of side movable members 25 and 25) and the urging members 271, 272, and 272 are stored in a movable member storage space 28, which is formed by the continuation of the space between pair of movable member-guiding plates 263a and 263b and the depressible storage recess 264. The three movable members 24, 25 and 25 are arranged in the longitudinal direction of the projecting holding member 20 and are arranged inside the movable member storage space 28.

The movable member storage space 28 is made by extending the space between the pair of movable member-guiding plates 263a and 263b into the base 261.

As shown in FIG. 1 and FIG. 5, when the projecting holding member 20 is installed in the clamped position (when it is not holding the optical fiber 50 as shown in FIG. 1, or when it is holding the optical fiber with smallest outer diameter 51 as shown in FIG. 5), the optical fiber storage groove 12a with a groove width T equal to the covered outer diameter of the optical fiber with smallest outer diameter 51 is formed between the recessed surface 31 of the recessed holding member 30 and the projecting surface 21 of the projecting holding member 20.

In the device for bending an optical fiber and receiving light 10 of this example, the optical fiber storage groove 12 includes an arc part 125 that curves around a point Oa (see FIGS. 1 and 5) at a center angle θa of 45 degree to 150 degree, and linear parts 126 that extend from the ends of the arc part 125 in a direction tangential to them. The projecting surface 21 of the projection 22 of the projecting holding member 20 and the recessed surface 31 of the recessed holding member 30 are shaped such as to form the optical fiber storage groove 12 including the arc part 125 and the linear parts 126 and 126 as described above.

As shown in FIG. 4A, the projecting surface 21 of the projection 22 includes a curved part 211 that forms the arc part 125 of the optical fiber storage groove 12, and straight parts 212 with flat faces that form the linear parts 126 of the optical fiber storage groove 12.

As shown in FIG. 2A, outer peripheral parts of the four movable member-guiding pieces 262 constituting the pair of movable member-guiding plates 263a and 263b protrude slightly from the projecting surface 21 on both sides of the width direction thereof perpendicular to the extension direction of the projecting surface 21 (the top-bottom direction in FIGS. 2A and 2B) to form rib-like protruding walls 262a that extend along the projecting surface 21. As shown in FIGS. 2A and 4A, the protruding walls 262a correspond to the shape of the projecting surface 21 including the curved part 211 and the straight parts 212 on both sides of the curved part 211, and the size of their protrusion from the projecting surface 21 is uniform along the whole length of the projecting surface 21.

As shown in FIG. 4A, the urging members 271, 272, and 272 are disposed on the back-face side of the movable members 24, 25, and 25 constituting the projection 22 (back-face plate 265 side of the base 261), and assembled in the movable member storage space 28, and elastically urge the movable members 24, 25, and 25 to the recessed holding member 30 side, i.e. the opposite side to the back face side of the projecting holding member 20 (the side where the back-face plate 265 is installed), hereinafter termed 'front side'. The movable members 24, 25, and 25 respectively resist the elasticity of the urging members 271, 272, and 272, and can push (depress) in the direction of leaving their initial positions shown in FIGS. 1 and 4A with respect to the recessed holding member 30, i.e. the movable members 24, 25, and 25 can be pressed into the back face side (top side in FIG. 1 and FIG. 4A) of the projecting holding member body 26 (see FIG. 4B and FIG. 6) from their initial positions.

Coil springs are here used as the urging members 271, 272, and 272. This is not limitative of the invention, however, as the urging member, it is also possible to use any elastic member made from an elastic material such as sponge-shaped foam resin or rubber, etc. Plate springs and the like can also be used.

In the projecting holding member 20 illustrated in this example, the movable members 24, 25, and 25 are pushed from their initial positions to the back face side of the projecting holding member 20 by the compression (elastic compression) of compression coil springs functioning as urging members. The movable members 24, 25, and 25 can be pushed while being guided by the inner surfaces of the movable member storage space 28. The movable members 24, 25, and 25 that have been pushed from their initial positions can move freely in the front-back direction of the projecting holding member 20 (the top-bottom direction in FIGS. 1, 4A, and 4B; in other words, the deep direction of the recess-shaped movable member storage space 28 which opens to the front side of the projecting holding member 20), and can be returned to their initial positions by the elasticity of the urging members 271, 272, and 272.

In FIGS. 4A and 4B, the reference symbol ΔY represents the movable width in the front-back direction of the side movable member 25 due to the elastic deformation of the urging member 272. The movable width ΔY of the side movable member 25 is, for example, approximately 3 mm. The movable width ΔY is not limited to 3 mm, however, and can be set as appropriate.

The movable member fitted with protrusion 24 also has a movable width in the front-back direction due to the elastic deformation of the urging member 271. The movable width of the movable member fitted with protrusion 24 can be the same as that of the side movable member 25, or can be different from the movable width of the side movable member 25.

When the movable members 24, 25, and 25 are in their initial positions, the urging members (compression coil springs) 271, 272, and 272 are not elastically compressed, and are in an expanded state.

In the device for bending an optical fiber and receiving light 10 according to the invention, the projecting holding member body 26 preferably includes stoppers (not shown) that restrict the movement of the movable members 24, 25, and 25 from their initial positions as shown in FIGS. 1 and 4A to the front side, and allow them to move to the back face side. When stoppers are provided, the device for bending an optical fiber and receiving light 10 can be configured such that the movable members 24, 25, and 25 at their initial positions can be elastically urged toward the recessed holding member 30 by the elasticity of the compression coil springs that are slightly elastically compressed.

As shown in FIGS. 1, 2A, and 4A, the movable member fitted with protrusion 24 includes a movable member body 241 disposed between the pair of side movable members 25 and 25, a positioning protrusion 23, and keys 243 and 244 (first key 243 and second key 244) provided on the top and bottom sides of the front end (top and bottom in FIGS. 2A and 2B) of the movable member body 241. The positioning protrusion 23 is provided at the end of the front side of the movable member body 241 (the end on the recessed holding member 30 side, which will be termed 'front end'), and protrudes further to the front side of the projecting holding member 20 (i.e. the recessed holding member 30 side) than the side movable members 25 and 25.

On the projection 22, the positioning protrusion 23 is provided such as to protrude to the front side from the center of the extension direction of the curved part 211 of the projecting surface 21. The positioning protrusion 23 is protruded at the tip of the projection 22 of the projecting holding member 20.

Specifically, in the projecting holding member 20 illustrated in this example, the curved part 211 and the straight parts 212 of the projecting surface 21 are formed by the end surfaces of the front end sides of the pair of side movable members 25 and 25.

As shown in FIGS. 2A, 3A, and 3B, the positioning protrusion 23 is a recess-shaped protruding wall having a recess 23a that is depressed from both ends of the width direction of the projecting surface 21 toward the center.

The positioning protrusion 23 shown in this example is formed in the shape of a plate with a vertical-direction size that roughly matches the width-direction size of the projecting surface 21, and with a thickness size (the protruding size from the movable member body 241 and the size in the direction orthogonal to the vertical-direction size) that is smaller than the vertical-direction size. The recess 23a is a notch depressed from the protrusion tip of the positioning protrusion 23 that protrudes from the movable member body 241.

As shown in FIG. 4A, each of the pair of side movable members 25 and 25 includes a movable member body 251 and a projecting wall 252. The movable member body 251 is adjacent to the movable member body 241 of the movable member fitted with protrusion 24 in the longitudinal direction of the projecting holding member 20, and hereinafter is also termed 'side movable member body 251'. The projecting wall 252 protrudes from the front-side end of the side movable member body 251 (the end on the recessed holding member 30, also termed 'front end') via the movable member body 241 of the movable member fitted with protrusion 24 toward the side movable member body 251 on the opposing partner side. The movable member body 241 of the movable member fitted with protrusion 24 is provided on the back face sides of the projecting walls 252 and 252 of the pair of side movable members 25 and 25 (the top side in FIGS. 1 and 4A), and between the side movable member bodies 251 and 251. The positioning protrusion 23 extends from the movable member body 241 of the movable member fitted with protrusion 24, via the gap between the projecting walls 252 and 252 of the pair of side movable members 25 and 25, and protrudes to the front side of the projecting holding member 20 further than the projecting walls 252 and 252.

Specifically, as shown in FIGS. 2A, 3A, and 3B, the recess 23a of the positioning protrusion 23 forms a recessed curved inner surface that curves such as to be depressed from the ends of the width direction of the projecting surface 21 toward the center.

As shown in FIGS. 1 and 4A, the curved part 211 of the projecting surface 21 forms a circumferential surface that curves around point Oa (see FIG. 1) at a fixed radius. The deep part 23b of the recess 23a (the deepest part viewed from the front side of the projecting holding member 20 and the recessed holding member 30 side), is positioned such that it contacts an imaginary extension of the curved part 211 in the gap between the projecting walls 252 and 252 of the pair of side movable members 25 and 25.

As shown in FIG. 4A, the deep part 23b of the recess 23a of the positioning protrusion 23 of the projecting holding member 20 in this example is shaped as a straight line extending in a direction tangential to the imaginary circumferential surface.

Alternatively, the recess 23a can be configured with the deep part 23b forming a curved line or a curved surface that curves at the same radius as the curved part 211 of the projecting surface 21.

When using the recess 23a with the deep part 23b forming a straight line extending in a direction tangential to the imaginary circumferential surface, the width of the gap between the projecting walls 252 and 252 of the pair of side movable members 25 and 25 (the size in the interval direction) and the length of the deep part 23b are set sufficiently small (e.g. 0.5 to 2.0 mm). The deep part 23b and the curved parts 211 formed on the pair of side movable members 25 and 25 substantially form arcs that connect at a fixed radius around the point Oa (see FIG. 1), and this ensures that the deep part 23b and the gap between the projecting walls 252 and 252 of the pair of side movable members 25 and 25 do not affect the bending of the optical fiber with smallest outer diameter 51.

On the other hand, when using the recess 23a with the deep part 23b forming a curved line or a curved surface that curves at the same radius as the curved part 211 of the projecting surface 21, there are no limitations on the width of the gap between the projecting walls 252 and 252 of the pair of side movable members 25 and 25 and on the size of the deep part 23b in the extension direction (peripheral direction) of the curved part 211; these can be, for example, 10 mm or greater.

As shown in FIGS. 2A and 2B, the first key 243 is stored in the gap 266 secured by the movable member-guiding plate 263a, and can move in the front-back direction of the projecting holding member 20. The second key 244 is stored in the gap secured by the movable member-guiding plate 263b, and can move in the front-back direction of the projecting holding member 20.

The first key 243 and the second key 244 stably maintain the orientation of the positioning protrusion 23.

As shown in FIG. 3B, when an optical fiber 50 is held between the recessed surface 31 of the recessed holding member 30 and the projection 22 of the projecting holding member 20 of the device for bending an optical fiber and receiving light 10, the recessed holding member 30 abuts to the protruding wall 262a protruding up and down from the front side end of the projection 22 of the projecting holding member 20, constituting the optical fiber storage groove 12 in a dark-box state for storing the optical fiber 50.

At this time, as shown in FIGS. 5 and 6, light-shielding members 269 are attached on the front surface sides of the side walls 268 on both sides of the movable member storage space 28 in the longitudinal direction of the projecting holding member 20. Also, light-shielding members 34 are attached to both ends of the recessed surface 31 of the recessed holding member 30 in the extension direction (longitudinal direction) thereof. The optical fiber 50 is held between the light-shielding members 269 and the light-shielding members 34. The light-shielding members 269 and 34 are block-shaped elastic bodies made from a light-shielding resin foam such as, for example, foam rubber; when holding the optical fiber 50 between them, the light-shielding members 269 and 34 are elastically deform, blocking both ends of the optical fiber storage groove 12 in the longitudinal direction thereof and preventing distortion light from being incident to the light receiving elements 40.

As shown in FIGS. 3B, 7, and 8A, the recessed holding member 30 specifically has a rib-like protruding wall 32 formed in the width direction of the recessed surface 31 (the top-bottom direction in FIG. 3B) along almost the whole of the extension direction of the recessed surface 31. As shown in FIG. 3B, in this device for bending an optical fiber and receiving light 10, the protruding walls 32 on both sides of the recessed surface 31 of the recessed holding member 30 abut to the protruding walls 262a protruding at both sides of the projection 22 of the projecting holding member 20, thereby configuring the optical fiber storage groove 12 in a dark box state.

The first key 243 and the second key 244 of the projecting holding member 20 in this example have portions that protrude (protruding portions) to the front side from the movable member-guiding parts 263a and 263b on both sides of the projection 22. However, as shown in FIGS. 7, 8A, and 8B, since key storage recesses 33a and 33b for storing the protruding portions of the first key 243 and the second key 244 are formed in the recessed holding member 30, when holding the optical fiber 50, the first key 243 and the second key 244 do not obstruct the locking of the projecting holding member 20 and the recessed holding member 30 (the abutting of the recessed holding member 30 to the protruding walls 262a on both sides of the projection 22).

As shown in FIGS. 5 and 6, the recessed surface 31 of the recessed holding member 30 includes a curved part 311, and straight parts 312 extending directly from the ends of the curved part 311.

To receive leak light radiated from the optical fiber 50, the light receiving elements 40 of the recessed holding member 30 are provided near the interfaces between the curved part 311 and the straight parts 312 (points a and b in FIG. 5, points c and d in FIG. 6).

Incidentally, in comparison with the recessed holding member 30A used when holding the optical fiber with smallest outer diameter 51 in the example shown in FIG. 5, the recessed holding member 30B in FIG. 6 has a curved part 311 with a smaller curved radius.

The light receiving elements 40 are assembled in the recessed holding member 30 such that their light acceptance surfaces 41 are exposed to the optical fiber storage groove 12.

The light receiving optical axis of each light receiving element 40 (the straight line passing through the center of the light acceptance surface 41 and perpendicular to the light acceptance surface 41) is aligned to the center in the width direction the projecting surface 21 of the projecting holding member 20.

As shown in FIG. 3B and FIG. 5, when the optical fiber with smallest outer diameter 51 is held between the recessed surface 31 of the recessed holding member 30 and the projection 22 of the projecting holding member 20, the recess 23a of the positioning protrusion 23 leads the optical fiber 50 (optical fiber with smallest outer diameter 51) to the center of the projection 22 (here, the center in the width direction of the projecting surface 21) and positions it with respect to the light receiving elements 40 (aligning function).

As shown in FIG. 3B, when the projecting holding member 20 and the recessed holding member 30 are locked together, an optical fiber storage groove 12a having a groove width T that is equal to the covered outer diameter of the optical fiber with smallest outer diameter 51 is secured between the projecting surface 21 and the recessed surface 31, leading the optical fiber with smallest outer diameter 51 pressed against the recessed surface 31 to the deep part 23b of the recess 23a of the positioning protrusion 23. The optical fiber with smallest outer diameter 51 is thus aligned to the light receiving elements 40. That is, the positioning protrusion 23 functions as a positioning mechanism for aligning the optical fiber 50 to the light receiving elements 40 (specifically, to the light acceptance surfaces 41). This can reduce variation in the measurement value of the leak light from the optical fiber 50.

In other words, in this embodiment, the device for bending an optical fiber and receiving light 10 includes the recessed holding member 30 having a recess (the recessed surface 31 and the key storage recess 33a), the projecting holding member 20 having a projection 22 projecting toward the recess (the recessed surface 31 and the key storage recess 33a), the light receiving elements 40 that receive leak light from the optical fiber 50 held between the recess (the recessed surface 31 and the key storage recess 33a) and the projection 22, an a supplemental support mechanism (including protrusions, the movable member body 241, the urging member 271, etc.). When the optical fiber 50 is held between the recess (the recessed surface 31 and the key storage recess 33a) and the projection 22, the supplemental support mechanism is substantially independent of the recess (the recessed surface 31 and the key storage recess 33a) or the projection 22, and supplementarily supports the optical fiber 50 between the recess (the recessed surface 31 and the key storage recess 33a) and the projection 22. For example, the supplemental support mechanism locally pushes the optical fiber 50 toward the recess (the key storage recess 33a) such that the optical fiber 50 touches the recess (the key storage recess 33a). The supplemental support mechanism adjusts at least one of the positioning and the bending of the optical fiber 50 between the recess (the recessed surface 31 and the key storage recess 33a) and the projection 22. The recessed holding member 30 and the projecting holding member 20 are mutually combined, and the distance between the recess (the recessed surface 31 and the key storage recess 33a) and the projection 22 can be changed. The protrusion (positioning protrusion 23) of the supplemental support mechanism can move relative to the projection 22, and can protrude from the summit of the projection 22 of the projecting holding member 20. Also, the protrusion (positioning protrusion 23) has a recess 23a which at least one part of the optical fiber 50 is disposed in. The recess 23a extends in one direction of the device for bending an optical fiber and receiving light 10, and is curved when viewed in a cross-section intersecting that one direction. The projecting holding member 20 includes the urging members 272 that urge at least one part of the projection 22 toward the recess (the recessed surface 31 and the key storage recess 33a) such that the projection 22 touches the optical fiber 50. The movable member body 241 of the supplemental support mechanism has a protrusion (the positioning protrusion 23) and can move relative to the projection 22. The urging member 271 of the supplemental support mechanism urges the movable member body 241 toward the recess (the key storage recess 33a) such that the protrusion (the positioning protrusion 23) touches the optical fiber 50. The projection 22 includes a groove (a depression formed in the projecting surface 21A) in which at least one part of the optical fiber 50 is disposed in. The groove in the projection 22 extends in one direction of the device for bending an optical fiber and receiving light 10, and is curved when viewed in a cross-section intersecting that one direction. The light receiving elements 40 can have light acceptance surfaces that are substantially circular or substantially rectangular. In this embodiment, the projection 22 and the optical fiber 50 touch each other at two contact points at least, which are mutually separated. The contact point between the optical fiber 50 and the protrusion (the positioning protrusion 23), which is a part of the supplemental support mechanism, is disposed between those two contact points.

In FIGS. 3B, 4A, and 5, the covered outer diameter of the optical fiber with smallest outer diameter 51 is smaller than the depth 23d of the recess 23a of the positioning protrusion 23 (see FIG. 3B). The depth 23d of the recess 23a is, in other words, the protruding size of the positioning protrusion 23 from the projecting surface 21 (more specifically, the imaginary extension of the curved part 211 of the projecting surface 21 in the gap between the projecting walls 252 and 252 of the pair of side movable members 25 in the projecting holding member 20 (see FIG. 5)) to the front side.

According to the device for bending an optical fiber and receiving light 10, when the optical fiber with smallest outer diameter 51 is held between the recessed surface 31 of the recessed holding member 30 and the projection 22 of the projecting holding member 20, the movable members 24, 25, and 25 constituting the projection 22 are not being pushed, the recessed surface 31 of the recessed holding member 30 and the projection 22 of the projecting holding member 20 define the optical fiber storage groove 12 (the optical fiber storage groove 12a shown in FIGS. 1 and 5) having a groove width T that is the same size as the covered outer diameter of the optical fiber with smallest outer diameter 51, and the projection 22 pushes the optical fiber with smallest outer diameter 51 against the recessed surface 31 of the recessed holding member 30. Consequently, in comparison with, for example, the device for bending an optical fiber and receiving light 101 having the conventional configuration described in Patent Document 1, the optical fiber with smallest outer diameter 51 can be reliably brought near to the light receiving elements 40, and the coupling efficiency of the leak light from the optical fiber with smallest outer diameter 51 to the light receiving elements 40 can be increased.

As shown in FIG. 6, when the optical fiber with thick diameter 52 is held between the recessed surface 31 of the recessed holding member 30 and the projection 22 of the projecting holding member 20, the movable members 24, 25, and 25 constituting the projection 22 are pushed in the direction of separating from the recessed surface 31 (the back surface side of the projecting holding member 20), and, due the elasticity of the urging members 271, 272, and 272 respectively provided on the movable members 24, 25, and 25, the movable members 24, 25, and 25 push the optical fiber 50 (in this case the optical fiber with thick diameter 52) into the recessed surface 31 of the recessed holding member 30. That is, in the device for bending an optical fiber and receiving light 10, the projecting holding member 20 can be used for holding the optical fiber with smallest outer diameter 51 and for holding the optical fiber with thick diameter 52.

When holding the optical fiber with thick diameter 52, the positioning protrusion 23 functions as a positioning mechanism that aligns the optical fiber 50 to the light receiving elements 40 (more specifically, the light acceptance surfaces 41). Therefore, variation in the measurement value of the leak light from the optical fiber 50 can be reduced. Also, the optical fiber with thick diameter 52 can be reliably brought near to the light receiving elements 40, and the coupling efficiency of leak light from the optical fiber 50 to the light receiving elements 40 can be increased.

Variation in Coupling Efficiency at Different Fiber Positions

Figure 9:
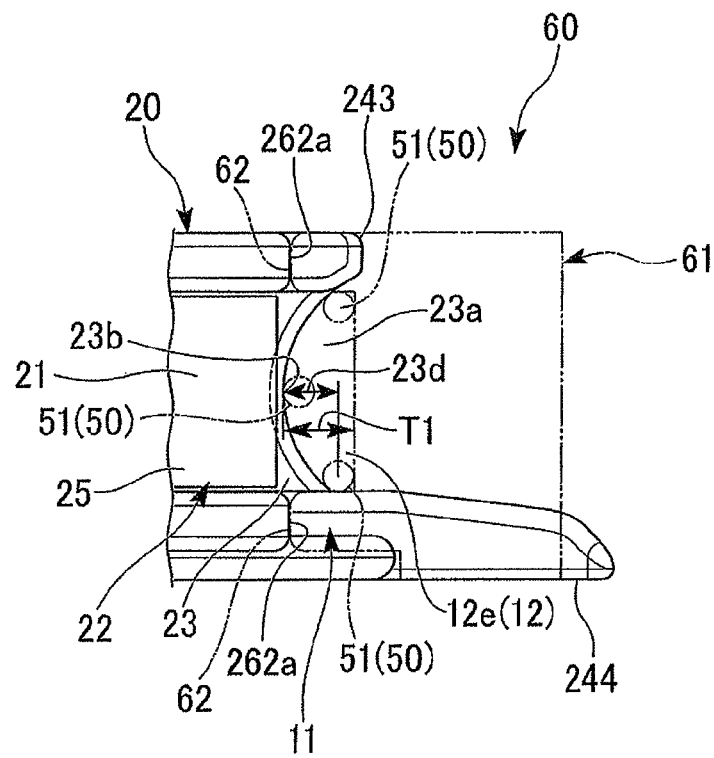
FIG. 9 is an explanatory view of a device for bending an optical fiber and receiving light for verification, and is a side view illustrating a tip vicinity of a projection of a projecting holding member.

As shown in FIG. 9, a device for bending an optical fiber and receiving light 60 (device for bending an optical fiber and receiving light for verification) was assembled, in which as a recessed holding member using a recessed holding member 61 including protruding walls 62 which are configured like the protruding walls 32 of the recessed holding member 30A in FIG. 3B, the only point of difference being that their protrusion size from the recessed surface 31 was increased. When the recessed holding member 61 is locked together with the projecting holding member 20, an optical fiber storage groove 12 (in FIG. 9 this groove is designated by reference numeral 12c) having a groove width T that is slightly greater than the depth 23d of the recess 23a of the positioning protrusion 23 can be secured between the recessed surface 31 and the projecting surface 21 of the projecting holding member 20.

Using the device for bending an optical fiber and receiving light 60, the optical fiber with smallest outer diameter 51 described earlier was held and released between the projecting holding member 20 and the recessed holding member 61 for thirty repetitions by opening and closing them, and the relationship (tendency) between the position of the optical fiber with smallest outer diameter 51 at the tip (specifically, the vicinity of the positioning protrusion 23) of the projection 22 of the projecting holding member 20 and the coupling efficiency at the light acceptance surface 40 of leak light radiated from the optical fiber with smallest outer diameter 51 was investigated.

Figure 10:
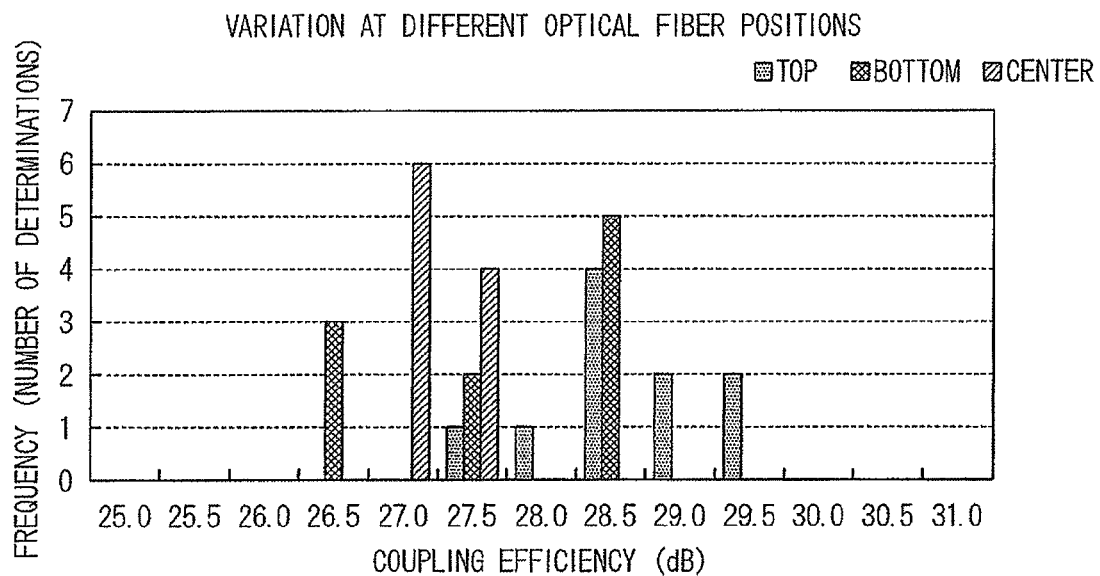
FIG. 10 is a graph of results of verifying variation in coupling efficiency at different fiber positions when an optical fiber with smallest outer diameter is held by the same device for bending an optical fiber and receiving light for verification.

FIG. 10 and Table 1 list the results.

In FIG. 10 and Table 1, 'Top', 'Bottom', and 'Center' denote the top, bottom, and center of the positioning protrusion 23 in FIG. 9. The top and bottom denote cases when the optical fiber with smallest outer diameter 51 is not guided to the center.

In FIG. 10, 'Coupling efficiency' along the horizontal axis is the difference (dB) between the power of transmission light passing through the optical fiber with smallest outer diameter 51 (the output of test light that is incident to one end of the unbent optical fiber with smallest outer diameter 51 and emitted from the other end of the optical fiber being measured as the transmission light power) and the light receiving level of the light receiving elements 40. The position of the optical fiber with smallest outer diameter 51 when the projecting holding member 20 and the recessed holding member 61 are locked together is determined as one of three states, top, bottom, and center, and the number of determinations is indicated as 'Frequency' on the vertical axis of FIG. 10. In Table 1, 'Fluctuation width' denotes the calculated difference between the maximum and minimum values of the coupling efficiency at each of the three states, top, bottom, and center, of the position of the optical fiber with smallest outer diameter 51.

TABLE 1

| Fiber position | Top | Bottom | Center |
| --- | --- | --- | --- |
| Maximum value (dB) | 27.5 | 26.3 | 26.6 |
| Minimum value (dB) | 29.3 | 28.3 | 27.4 |
| Fluctuation width (dB) | 1.8 | 2.0 | 0.8 |

In the test to investigate the coupling efficiency using the device for bending an optical fiber and receiving light tested above, an optical fiber storage groove 12c, which is secured between the recessed surface 31 and the projecting surface 21 of the projecting holding member 20 and has a groove width T that is slightly greater than the depth 23d of the recess 23a of the positioning protrusion 23, is made to store and hold the optical fiber with smallest outer diameter 51 having a covered outer diameter that is smaller than the depth 23d of the recess 23a of the positioning protrusion 23. Therefore, when the projecting holding member 20 and the recessed holding member 61 are locked together to hold the optical fiber with smallest outer diameter 51, a clearance (gap) for enabling the optical fiber with smallest outer diameter 51 to move in the optical fiber storage groove 12c is secured between them.

As is clear from FIG. 10 and Table 1, when the optical fiber is at the center position, the fluctuation width of the coupling efficiency is considerably smaller than at the top or bottom positions of the optical fiber. Also, as shown in FIG. 10, when the optical fiber is at the center, it is confirmed that the coupling efficiency can be enhanced further than when it is at the top or the bottom.

As shown in FIGS. 1, 3B, and 5, if the device for bending an optical fiber and receiving light 10 includes the optical fiber storage groove 12a having a groove width T which is equal to the covered outer diameter of the optical fiber with smallest outer diameter 51 when the projecting holding member 20 and recessed holding member 30A are locked together, the optical fiber with smallest outer diameter 51 can be aligned to the center of the projection 22 (the center of the top-bottom direction in FIGS. 3A and 3B), whereby the light acceptance surface 40 can reliably achieve excellent coupling efficiency (coupling efficiency of leak light). Moreover, since the fluctuation width of the coupling efficiency decreases, variation in the measurement of leak light from the optical fiber 50 can also be reduced.

(Effects of Gap in Optical Fiber Holding Part)

The device for bending an optical fiber and receiving light 10 wherein, as shown in FIGS. 1 and 5, when the projecting holding member 20 and the recessed holding member 30A are locked together, the optical fiber storage groove 12a having a groove width T which is equal to the covered outer diameter of the optical fiber with smallest outer diameter 51 can be formed between the recessed surface 31 of the recessed holding member 30 and the projecting surface 21 of the projection 22 of the projecting holding member 20 and the deep part 23b of the recess 23a of the positioning protrusion 23, and the device for bending an optical fiber and receiving light for verification 60 (device for bending an optical fiber and receiving light for verification) shown in FIG. 9, were prepared. An optical fiber with smallest outer diameter 51 was then held and released in the optical fiber holding part 11 of each device for ten repetitions by opening and closing the projecting holding member 20 and the recessed holding member 30, and the coupling efficiency on the light acceptance surfaces 40 of leak light radiated from the optical fiber with smallest outer diameter 51 was investigated.

Figure 11:
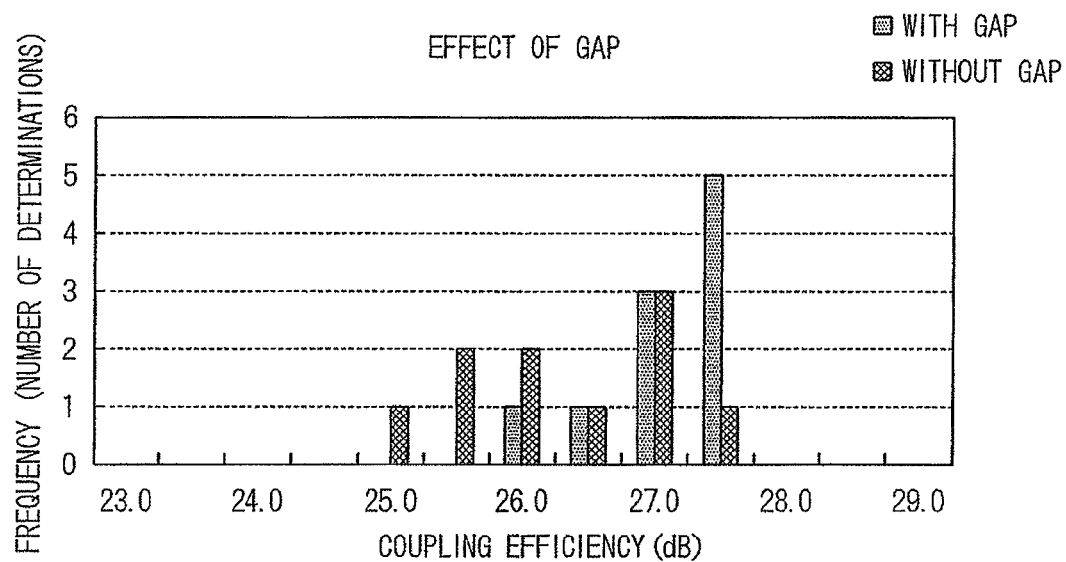
FIG. 11 is a graph of results of investigating the coupling efficiency of leak light from the optical fiber in a light receiving element in both cases, where the device for bending an optical fiber and receiving light shown in FIG. 1 holds an optical fiber with smallest outer diameter, and where the device for bending an optical fiber and receiving light for verification shown in FIG. 9 holds an optical fiber with smallest outer diameter.

FIG. 11 lists the results.

In FIG. 11, 'With gap' denotes the result of a test performed using the device for bending an optical fiber and receiving light for verification 60, while 'Without gap' denotes the result of a test performed using the device for bending an optical fiber and receiving light 10 which can secure the optical fiber storage groove 12 having a groove width T which is equal to the covered outer diameter. Also, in FIG. 11, 'Coupling efficiency' is the difference (dB) between the power of transmission light passing through the optical fiber with smallest outer diameter 51 (the output of test light that is incident to one end of the unbent optical fiber with smallest outer diameter 51 and emitted from the other end of the optical fiber being measured as the transmission light power) and the light receiving level of the light receiving elements 40.

As is clear from FIG. 11, the device for bending an optical fiber and receiving light 10 that can secure the optical fiber storage groove 12 with a groove width T equal to the covered outer diameter can enhance the coupling efficiency more than the device for bending an optical fiber and receiving light for verification 60 (i.e. it obtains a smaller value for the coupling efficiency in FIG. 11 and Table 1).

Figure 12:
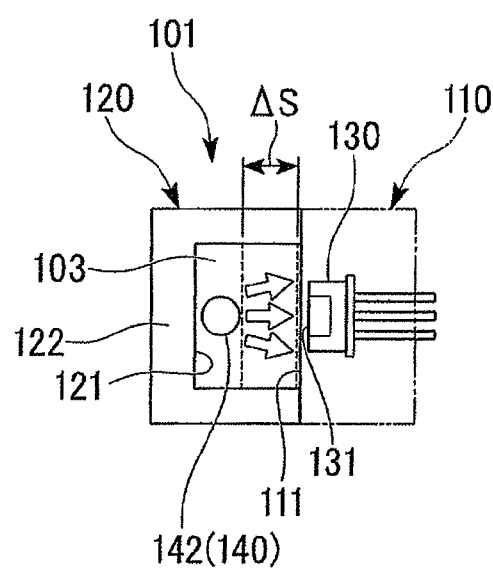
FIG. 12 is an explanatory view of effects of a gap that allows the optical fiber to move in the direction of the groove width of an optical fiber storage groove in an example of a related device for bending an optical fiber and receiving light.

As in the prior art described in Patent Document 1, when the optical fiber with smallest outer diameter 142 is held using the device for bending an optical fiber and receiving light 101, which secures a gap (optical fiber storage groove 103) corresponding to the outer covered diameter of the optical fiber with largest outer diameter 141 between the projecting surface 121 of the projection 122 of the projecting holding member 120 and the recessed surface 111 of the recessed holding member 110, as shown in FIG. 12, a gap ΔS occurs between the light receiving element 130 and the optical fiber 142, with the result that the light receiving element 130 may not be able to properly receive leak light from the optical fiber 142.

In contrast, in the device for bending an optical fiber and receiving light according to the invention, all or part of the portion of the projection of the projecting holding member that touches the optical fiber (in the embodiment described here, the whole of the projection 22) is a depressible part, and the depressed depressible part (in the embodiment described here, the three movable members 24, 25, and 25) is elastically urged by the urging force of the urging members assembled in the projecting holding member toward the recessed holding member side (the front side), pushing the optical fiber 50 against the recessed surface 31 of the recessed holding member 30. Therefore, the device for bending an optical fiber and receiving light according to the invention can push the optical fiber 50 against the recessed surface 31 of the recessed holding member 30 while accommodating a wide range of covered outer diameters of the optical fiber 50. Moreover, the positioning protrusion 23 can push the optical fiber 50 against the recessed surface 31 of the recessed holding member 30, aligning it with the light receiving axes of the light receiving elements 40. This can reliably achieve an excellent coupling efficiency.

When the device for bending an optical fiber and receiving light for verification 60 is used for holding an optical fiber 50 with a covered outer diameter that is greater than the depth 23d of the recess 23a of the positioning protrusion 23, the positioning protrusion 23 provided on the projection 22 pushes the optical fiber 50 against the recessed surface 31 of the recessed holding member 30, and can hold it in the optical fiber holding part 11 in alignment to the light receiving axes of the light acceptance surfaces 40. In respect of this point, the device for bending an optical fiber and receiving light for verification 60 also functions as one example of the device for bending an optical fiber and receiving light according to the invention.

As shown in FIG. 13A, a light receiving element 42 having a rectangular light acceptance surface 41 is used as the light receiving element 40.

As shown in FIG. 13B, in the device for bending an optical fiber and receiving light 10 according to this invention, the light receiving element 44 having a circular light acceptance surface 43 can be used. However, when using this light receiving element 44, it is more difficult to secure the light acceptance surface area (the area of the light acceptance surface 43) than when using the light receiving element 42 shown in the example of FIG. 13A. That is, when assembling a light receiving element in a plate-like recessed holding member 30, there are restrictions on the size of the light receiving element in the thickness direction of the recessed holding member 30. As shown in FIG. 13B, when using the light receiving element 44 having a circular light acceptance surface 43, if the size of the light acceptance surface 43 is increased to enhance the coupling efficiency of leak light from the optical fiber 50, the package size of the light receiving element 44 (the outer diameter φ in FIG. 13B) inevitably becomes large.

In contrast, according to the light receiving element 42 shown in the example of FIG. 13A, the four corners 41a of the rectangular (in this example, square) light acceptance surface 41 can be effectively used for receiving leak light from the optical fiber 50, and, even when the package size in the thickness direction of the recessed holding member 30 (the top-bottom direction in FIGS. 13A and 13B) is the same as that of the light receiving element 44 shown in FIG. 13B, the light receiving area can be enlarged by approximately 1.2 times that of the light receiving element 44 shown in FIG. 13B. Therefore, in comparison with the light receiving element 44 of FIG. 13B, the light receiving element 42 of FIG. 13A is more effective in enhancing both the light receiving efficiency and the coupling efficiency.

In FIG. 13A, the imaginary line represents the size of the light acceptance surface 43 of the light receiving element 44 wherein the size in the thick direction of the recessed holding member 30 is the same as that of the light receiving element 42. Due to the existence of the projecting portions (the four corners 41a) of the light acceptance surface 41 of the light receiving element 42 projecting to the outer side from the outer periphery of the light acceptance surface 43 shown by the imaginary line in FIG. 13A, it is possible to secure a larger light receiving area of the light acceptance surface 41 than the circular light acceptance surface 43 of the light receiving element 44.

The rectangular light acceptance surface 41 of the light receiving element 42 is not limited to the shape of a square, and can be, for example, oblong.

Coupling Efficiency of Different Light Acceptance Surfaces

As shown in FIGS. 3B and 5, a device for bending an optical fiber and receiving light that can secure the optical fiber storage groove 12 with a groove width T that is equal to the covered outer diameter is prepared using the recessed holding member 30 and the projecting holding member 20 assembled from the light receiving elements 42 having the rectangular light acceptance surface 41 described above, and a device for bending an optical fiber and receiving light was prepared using the light receiving elements 44 with circular light acceptance surfaces 43 as the light receiving elements 40 assembled in the recessed holding member 30, the latter device being otherwise the same as the former. An optical fiber with smallest outer diameter 51 is then held and released in the optical fiber holding part 11 of each device for bending an optical fiber and receiving light for twenty repetitions by opening and closing the projecting holding member 20 and the recessed holding member 30, and the coupling efficiency on the light receiving elements 40 of leak light radiated from the optical fiber with smallest outer diameter 51 was investigated.

The results are listed in FIG. 14 and Table 2. In FIG. 14 and Table 2, 'Angular' denotes test results obtained using a device for bending an optical fiber and receiving light including the light receiving elements 42 with the rectangular light acceptance surfaces 41, while 'Circular' denotes test results obtained using a device for bending an optical fiber and receiving light including the light receiving elements 44 with circular light acceptance surfaces 43. In FIG. 14, 'Coupling efficiency' is the difference (dB) between the power of transmission light passing through the optical fiber with smallest outer diameter 51 and the light receiving level of the light receiving elements 40.

TABLE 2

| With gap or without gap | Circular | Angular |
|---|---|---|
| Maximum value (dB) | 27.2 | 25.3 |
| Minimum value (dB) | 29.2 | 28.0 |
| Average value (dB) | 28.2 | 26.8 |

As is clear from FIG. 14 and Table 2, when using the device for bending an optical fiber and receiving light including the light receiving elements 42 with the rectangular light acceptance surfaces 41, the coupling efficiency can be enhanced (the value of the coupling efficiency in FIG. 14 can be kept low) in comparison with the device for bending an optical fiber and receiving light using the light receiving elements 44 with circular light acceptance surfaces 43.

Modification Example 1

In the embodiment described above, the recess 23a for aligning the optical fiber is provided only at the tip of the projection 22 of the projecting holding member 20. However, the projection of the projecting holding member according to this invention is not limited to this configuration, and all or part of the projecting surfaces on both sides of the positioning protrusion 23 of the projection 22 of the projecting holding member 20 can also be recessed surfaces that form recesses for aligning the optical fiber.

Figure 15:
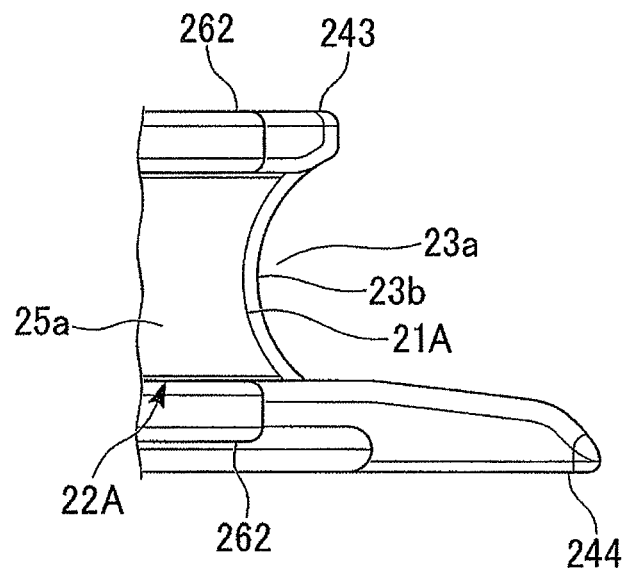
FIG. 15 is a view of a modification of the projection of the projecting holding member of the device for bending an optical fiber and receiving light according to the same embodiment, being a side view of a configuration in which, in addition to positioning protrusion at the tip of the projection, a recessed portion for positioning the optical fiber is also formed in a side-part moving member.

FIG. 15 shows a projection 22A wherein projecting surfaces on both sides of the positioning protrusion 23 of the projection 22 of the projecting holding member 20 already described are modified to groove-like projecting surfaces 21A which are depressed along the entire longitudinal direction (extension direction) thereof from the ends of the width direction toward the center. That is, as shown in FIG. 15, recesses (grooves) for aligning the optical fiber are provided not only in the movable member fitted with protrusion 24, but also in the side movable members 25a on both sides thereof.

When recesses for aligning the optical fiber are provided in parts other than the tip of the projection 22 of the projecting holding member 20, the optical fiber 50 can be more reliably positioned in the light receiving axes of the light receiving elements 40, whereby an excellent coupling efficiency can be more reliably achieved.

Modification Example 2

In the embodiment described above, the projection 22 of the projecting holding member 20 is constituted by the three depressible movable members 24, 25, and 25. However, the configuration can be one where only one part of the projection is a depressible, and other parts are fixed (i.e. fixed to a projecting holding member body wherein the depressible part is assembled in the projecting holding member).

Figure 16:
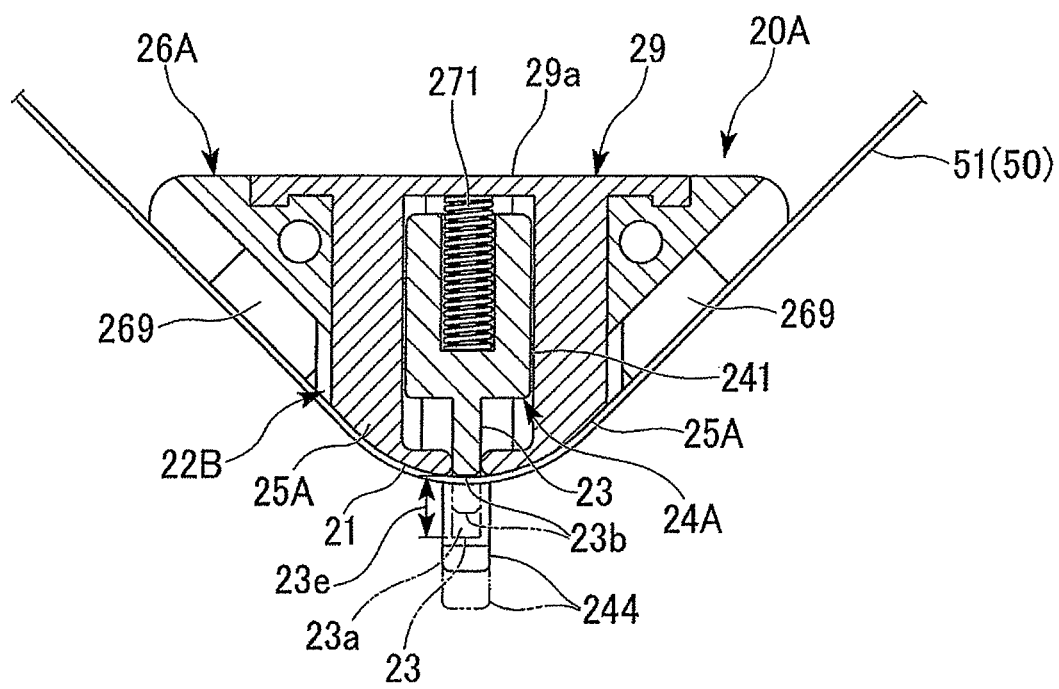
FIG. 16 is a view of a modification of the projection of the projecting holding member of the device for bending an optical fiber and receiving light according to the same embodiment, being a plan cross-sectional view for explanation of a projection including a pair of side fixed walls that are fixed to the projecting holding member, and a movable member fitted with protrusion that functions as a depressible part disposed between the pair of side fixed walls.

FIG. 16 is an example of a projecting holding member 20A including a projection 22B, as a projection, constituted by a movable member 24A (depressible part) where a positioning protrusion 23 is provided, and side fixed walls 25A and 25A provided on both sides of the movable member 24A.

Specifically, the configuration of the projecting holding member body 26A is that of the projecting holding member body 26 of the projecting holding member 20 described above (see FIGS. 4A, 4B, etc.) with the back face plate 265 removed.

The projecting holding member 20A shown in the example of FIG. 16 specifically includes a projection-forming member 29, the movable member 24A (movable member fitted with protrusion), and the urging member 271. In the projection-forming member 29, side fixed walls 25A are provided at two mutually separated points on a back surface plate 29a fixed to the back surface side of the projecting holding member body 26A. The urging member 271 is assembled in the projecting holding member body 26A, and elastically urges the movable member fitted with protrusion 24A to the front side (the recessed holding member 30 side).

The positioning protrusion 23 is provided at the tip of the projection 22B of the projecting holding member 20A. In comparison with the movable member fitted with protrusion 24 of the projecting holding member 20 described in the examples of FIGS. 4A, 4B, etc., the protrusion size of the positioning protrusion 23 of the movable member fitted with protrusion 24A protrudes from the movable member body 241 become large. As shown in FIG. 16, in the projecting holding member 20A, the protrusion size 23e of the positioning protrusion 23 of the movable member fitted with protrusion 24A is greater than that of the positioning protrusion 23 of the movable member fitted with protrusion 24 of the projecting holding member 20 described in the examples of FIGS. 4A, 4B, etc. The protrusion size 23e of the positioning protrusion 23 is a protrusion size to the front side from the projecting surface 21 formed by the front-side end faces of the pair of side fixed walls 25A and 25A. As shown by the imaginary line in FIG. 16, when the optical fiber 50 is not being held (e.g. when it is in the unclamped position), the deep part 23b of the recess 23a is disposed further to the front side than the projecting surface 21 due to the elasticity of the urging member 271. When the optical fiber 50 (here, the optical fiber with smallest outer diameter 51) is held between the projecting holding member 20A and the recessed holding member 30, only the movable member fitted with protrusion 24A is depressed, and, due to the elasticity of the urging member 271, the movable member fitted with protrusion 24A pushes the optical fiber 50 against the recessed surface 31 of the recessed holding member 30, holding the optical fiber 50 between the projecting surface 21 and the recessed surface 31.

The invention is not limited to the embodiment described above, and can be modified in various ways without deviating from its main points.

The device for bending an optical fiber and receiving light according to the invention need only include an optical fiber holding part that holds the optical fiber between a projecting holding member and a recessed holding member, and an aligning mechanism provided thereto for aligning the optical fiber to the centers of light receiving elements, the configuration not being limited to the embodiment described above. For example, a positioning protrusion can be provided to the recessed holding member.

Also, the projection of the projecting holding member according to the invention can be configured without a depressible part. The projection of the projecting holding member can be configured with a positioning protrusion at its tip and without a depressible part (i.e. the whole of the projection can be fixed to the projecting holding member). In this case, however, the device for bending an optical fiber and receiving light is appropriately configured such that a gap (optical fiber storage groove) with a groove width that is equal to (or substantially equal to) the covered outer diameter of the optical fiber being held is secured between the recessed surface of the recessed holding member and the deep part of the recess of the positioning protrusion of the projecting holding member installed at the clamped position, the optical fiber is pushed toward the deep part of the recess of the positioning protrusion, and then held and fixed between the positioning protrusion and the recessed holding member. The positioning protrusion thereby functions reliably as an aligning mechanism, and can reliably align the optical fiber to the light receiving elements.

Figure 17:
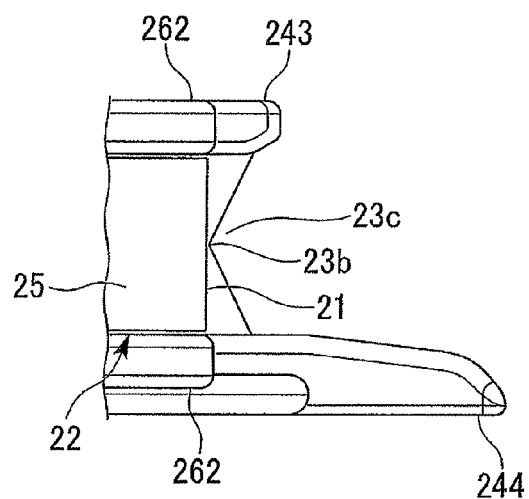
FIG. 17 is a side plan view for explanation of a modification of a recessed portion for positioning an optical fiber on the tip of a projection of the projecting holding member of the device for bending an optical fiber and receiving light in the same embodiment.
Figure 18:
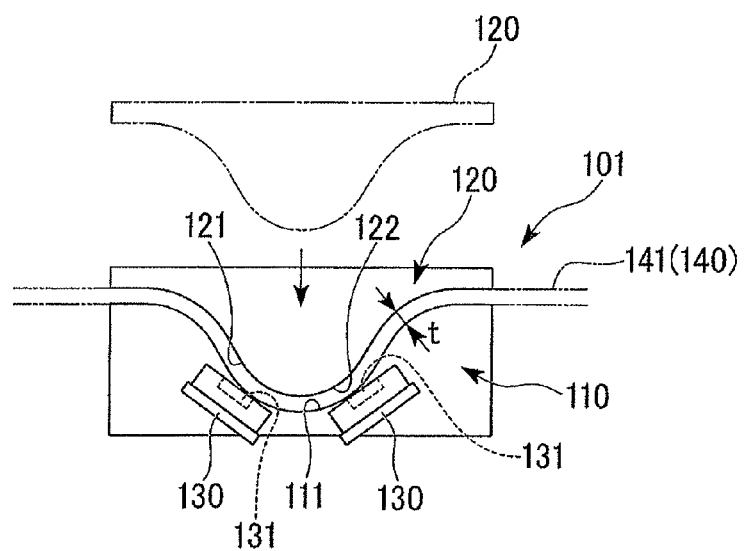
FIG. 18 is a plan view of a schematic configuration of a related device for bending an optical fiber and receiving light.
Figure 19A:
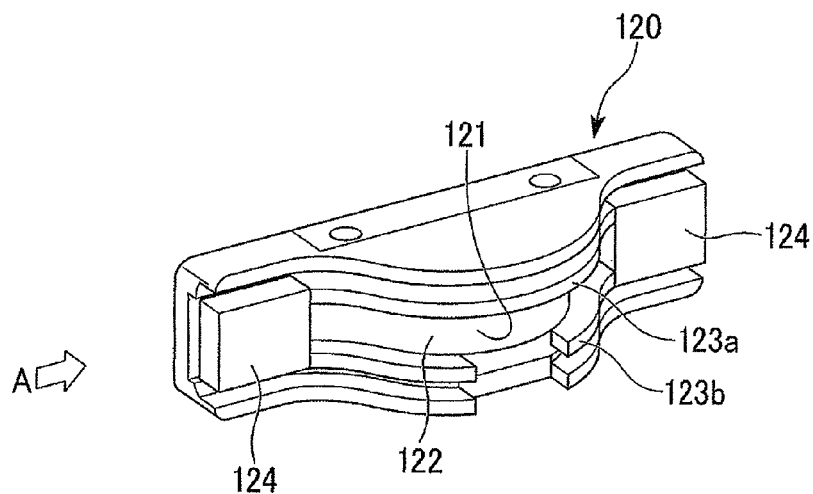
FIG. 19A is a perspective view of a projecting holding member of the device for bending an optical fiber and receiving light of FIG. 18.
Figure 19B:
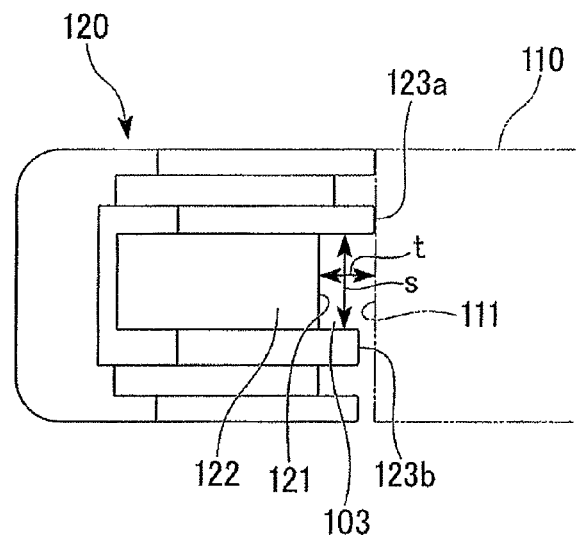
FIG. 19B is a side view of the structure shown in FIG. 19A viewed from the direction of arrow A.
Figure 20:
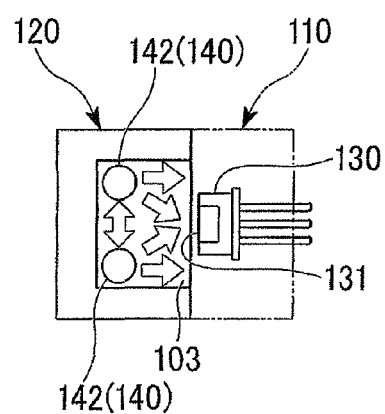
FIG. 20 is a cross-sectional view for explanation of variations in the different fiber position in an optical fiber storage groove between a projecting holding member and a recessed holding member of the device for bending an optical fiber and receiving light in FIG. 18.

The shape of the recess in the positioning protrusion is not limited to one forming a recessed curved inner surface as shown in the examples of FIGS. 2A, 2B, 3A, and 3B. For example, as shown in FIG. 17, it can form a V-shaped inner surface (recess 23c) or such like.

According to the device for bending an optical fiber and receiving light of the present invention, an optical fiber disposed between the recessed surface of a recessed holding member and the projecting surface of a projecting holding member can be aligned to the centers of the light acceptance surfaces of light receiving elements by an alignment mechanism provided at an optical fiber holding part. This makes it possible to stably measure leak light generated from the optical fiber when it is held and bent between the recessed holding member and the projecting holding member.

What is claimed is:

1. A device for bending an optical fiber and receiving light comprising:
   a recessed holding member having a recessed surface;
   a projection holding member having a projection forming a projecting surface opposite the recessed surface; and
   a light receiving element receiving leak light leaking from the optical fiber that is held and bent between the recessed surface of the recessed holding member and the projecting surface of the recessed holding member, the projection comprising:
- a central movable member having a body and a positioning protrusion protruding from the body toward the recessed holding member;
- side movable members provided on both sides of the central movable member; and
- urging members elastically urging the central movable member and the side movable members toward the recessed holding member respectively, wherein the positioning protrusion of the central movable member has a recess-shaped protruding wall having a recess that is depressed relative to both ends of the wall in the width direction of the projecting surface so that the recess of the wall aligns the optical fiber to a center of a light acceptance surface of the light receiving element.

2. The device for bending an optical fiber and receiving light according to claim 1, wherein
the light acceptance surface of the light receiving element has a rectangular-shape.

* * * * *